United States Patent
Luzinski et al.

(10) Patent No.: US 12,231,187 B2
(45) Date of Patent: Feb. 18, 2025

(54) HIGH SPEED DATA COMMUNICATIONS SYSTEM FOR INDUSTRIAL USE IN PACKAGED GOODS WITH OUT OF BAND COMMUNICATIONS HAND OFF

(71) Applicant: NuCurrent, Inc., Chicago, IL (US)

(72) Inventors: Jason Luzinski, Chicago, IL (US); Michael Katz, Glen Ellyn, IL (US); Mark Melone, Frankfort, IL (US)

(73) Assignee: NuCurrent, Inc., Chicago, IL (US)

(*) Notice: Subject to any disclaimer, the term of this patent is extended or adjusted under 35 U.S.C. 154(b) by 172 days.

(21) Appl. No.: 17/502,943

(22) Filed: Oct. 15, 2021

(65) Prior Publication Data

US 2023/0118888 A1    Apr. 20, 2023

(51) Int. Cl.
*H04B 5/72* (2024.01)
*H04B 5/26* (2024.01)
*H04W 4/20* (2018.01)

(52) U.S. Cl.
CPC .................. *H04B 5/72* (2024.01); *H04B 5/26* (2024.01); *H04B 5/266* (2024.01); *H04W 4/20* (2013.01)

(58) Field of Classification Search
CPC ...... H04W 4/80; H04B 5/0031; H04B 5/0037
See application file for complete search history.

(56) References Cited

U.S. PATENT DOCUMENTS

| | | |
|---|---|---|
| 5,581,190 A | 12/1996 | Herring et al. |
| 7,999,417 B2 | 8/2011 | Kato et al. |
| 9,928,391 B1 | 3/2018 | Simons |
| 9,979,440 B1 | 5/2018 | Leabman et al. |
| 10,122,220 B2 | 11/2018 | Sankar |
| 10,284,025 B2 | 5/2019 | Zeine et al. |
| 10,356,537 B2 | 7/2019 | Niklaus et al. |
| 10,516,285 B2 * | 12/2019 | Pawar ..................... H02J 50/10 |

(Continued)

FOREIGN PATENT DOCUMENTS

| | | |
|---|---|---|
| CN | 105495880 A | 4/2016 |
| CN | 211747405 U | 10/2020 |
| WO | 2021098013 A1 | 5/2021 |

OTHER PUBLICATIONS

International Searching Authority, PCT International Search Report and Written Opinion, PCT International Application No. PCT/US2022/014404 dated May 3, 2022, 12 pages.

(Continued)

*Primary Examiner* — Wen W Huang
(74) *Attorney, Agent, or Firm* — Lee Sullivan Shea & Smith LLP

(57) ABSTRACT

A method for providing an electronic device includes manufacturing the electronic device at a manufacturing location, wherein manufacturing the electronic device includes connecting a wireless receiver system to the electronic device. The method further includes packaging the electronic device at a packaging location. The method further includes wirelessly transmitting data to the electronic device at a data transmission site, wherein wirelessly transmitting the data to the electronic device is performed by transferring data via near field magnetic induction utilizing a wireless transmission system and transmitting data via an out of band communications system, the wireless transmission system configured to magnetically connect with the wireless receiver system associated with the electronic device.

19 Claims, 19 Drawing Sheets

(56) References Cited

U.S. PATENT DOCUMENTS

| | | |
|---|---|---|
| 10,700,742 B1 | 6/2020 | Martchovsky |
| 10,790,694 B2 | 9/2020 | Kwon et al. |
| 10,923,927 B2 | 2/2021 | Choi |
| 11,099,064 B2 | 8/2021 | Matthys |
| 11,462,945 B2 | 10/2022 | Goodchild et al. |
| 11,476,898 B2 | 10/2022 | Peralta et al. |
| 11,496,004 B2 | 11/2022 | Park |
| 11,539,400 B2 | 12/2022 | Tsukamoto |
| 11,563,337 B2 | 1/2023 | Yuan et al. |
| 11,575,269 B1 | 2/2023 | Stousland et al. |
| 11,588,351 B2 | 2/2023 | Danilovic et al. |
| 11,611,239 B2 | 3/2023 | Pinciuc et al. |
| 11,648,692 B2 | 5/2023 | Schaefer et al. |
| 11,648,693 B2 | 5/2023 | Schaefer et al. |
| 11,670,968 B2 | 6/2023 | Lee et al. |
| 11,831,033 B2 | 11/2023 | Rayeski et al. |
| 2002/0127748 A1 | 9/2002 | Gardner |
| 2005/0068161 A1 | 3/2005 | Ichinose et al. |
| 2006/0077751 A1 | 4/2006 | Oh et al. |
| 2007/0033474 A1 | 2/2007 | Han et al. |
| 2011/0012432 A1 | 1/2011 | Jung et al. |
| 2011/0285212 A1 | 11/2011 | Higuma et al. |
| 2012/0025631 A1 | 2/2012 | Shionoiri et al. |
| 2012/0306284 A1 | 12/2012 | Lee et al. |
| 2012/0329405 A1 | 12/2012 | Lee et al. |
| 2013/0027078 A1 | 1/2013 | Nakano et al. |
| 2013/0035034 A1 | 2/2013 | Kim et al. |
| 2013/0062966 A1 | 3/2013 | Verghese et al. |
| 2013/0076153 A1 | 3/2013 | Murayama et al. |
| 2013/0084800 A1* | 4/2013 | Troberg ............... H04B 5/0081 455/63.1 |
| 2013/0099586 A1 | 4/2013 | Kato |
| 2013/0130629 A1 | 5/2013 | Warren et al. |
| 2013/0212643 A1 | 8/2013 | Takemura et al. |
| 2014/0159646 A1 | 6/2014 | Sankar et al. |
| 2014/0159655 A1 | 6/2014 | Kim et al. |
| 2014/0269886 A1 | 9/2014 | Plumb et al. |
| 2014/0339923 A1 | 11/2014 | Simopoulos et al. |
| 2015/0091523 A1 | 4/2015 | Satyamoorthy et al. |
| 2015/0156284 A1 | 6/2015 | Akhter et al. |
| 2015/0172441 A1 | 6/2015 | Samhat |
| 2015/0263793 A1* | 9/2015 | Ota ...................... H04B 5/0031 455/41.1 |
| 2015/0340877 A1 | 11/2015 | Lin et al. |
| 2015/0340910 A1 | 11/2015 | Petras et al. |
| 2015/0370915 A1 | 12/2015 | Kim |
| 2015/0371532 A1* | 12/2015 | e Silva ............. H04N 21/42224 340/12.28 |
| 2015/0372493 A1 | 12/2015 | Sankar |
| 2016/0054396 A1 | 2/2016 | Bell et al. |
| 2016/0094042 A1 | 3/2016 | Maniktala et al. |
| 2016/0134334 A1 | 5/2016 | Park et al. |
| 2016/0285311 A1* | 9/2016 | Masumoto ............. H02J 50/10 |
| 2016/0336785 A1 | 11/2016 | Gao et al. |
| 2016/0359371 A1 | 12/2016 | Wikstrand |
| 2017/0026723 A1* | 1/2017 | Wan ........................ H04Q 9/00 |
| 2017/0055109 A1* | 2/2017 | Van Nieuwenhuyze ................... H04W 12/02 |
| 2017/0126070 A1 | 5/2017 | Lee et al. |
| 2017/0272108 A1 | 9/2017 | Filipovic et al. |
| 2017/0305280 A1 | 10/2017 | Weidner et al. |
| 2018/0026481 A1 | 1/2018 | Ku et al. |
| 2018/0062422 A1 | 3/2018 | Kim et al. |
| 2018/0084406 A1 | 3/2018 | Tandai et al. |
| 2018/0108882 A1 | 4/2018 | Yang |
| 2018/0189224 A1 | 7/2018 | Vadivelu et al. |
| 2018/0232894 A1 | 8/2018 | Kim et al. |
| 2018/0269725 A1 | 9/2018 | Yeo et al. |
| 2018/0269925 A1 | 9/2018 | Matsuo |
| 2018/0309314 A1* | 10/2018 | White, II ............... H02J 50/12 |
| 2018/0309315 A1* | 10/2018 | Der ..................... H02J 7/00714 |
| 2019/0068300 A1 | 2/2019 | Lu et al. |
| 2019/0097448 A1 | 3/2019 | Partovi |
| 2019/0148966 A1 | 5/2019 | Choi et al. |
| 2019/0173529 A1 | 6/2019 | Garcia et al. |
| 2019/0174239 A1 | 6/2019 | Niklaus et al. |
| 2019/0252919 A1 | 8/2019 | Ogawa et al. |
| 2019/0280532 A1 | 9/2019 | Matsuo et al. |
| 2019/0303945 A1 | 10/2019 | Mitra et al. |
| 2019/0354361 A1 | 11/2019 | Li et al. |
| 2019/0391620 A1 | 12/2019 | Matsuo |
| 2020/0052667 A1 | 2/2020 | Jeon et al. |
| 2020/0076249 A1 | 3/2020 | Mao et al. |
| 2020/0161907 A1 | 5/2020 | Yang et al. |
| 2020/0249771 A1 | 8/2020 | Kim et al. |
| 2020/0343745 A1 | 10/2020 | Choi |
| 2020/0366135 A1 | 11/2020 | Kim et al. |
| 2021/0083528 A1 | 3/2021 | Stingu et al. |
| 2021/0099196 A1 | 4/2021 | Tang et al. |
| 2021/0105045 A1* | 4/2021 | Chen ........................ H04B 5/26 |
| 2021/0148754 A1 | 5/2021 | Matthys |
| 2021/0184487 A1 | 6/2021 | Rafferty et al. |
| 2021/0257863 A1 | 8/2021 | Sato |
| 2021/0265862 A1 | 8/2021 | Yeo et al. |
| 2021/0266042 A1 | 8/2021 | Park et al. |
| 2021/0296944 A1* | 9/2021 | Shichino ............. H02J 7/00034 |
| 2021/0306036 A1 | 9/2021 | Park et al. |
| 2022/0200661 A1* | 6/2022 | Lee ........................ H04W 76/30 |
| 2022/0303167 A1 | 9/2022 | Wang et al. |
| 2023/0079549 A1 | 3/2023 | Luzinski et al. |
| 2023/0261528 A1 | 8/2023 | Park et al. |

OTHER PUBLICATIONS

International Searching Authority, PCT International Search Report and Written Opinion, PCT International Application No. PCT/US2022/046191 dated Feb. 3, 2023, 11 pages.

International Searching Authority, PCT International Search Report and Written Opinion, PCT International Application No. PCT/US2022/046878 dated Feb. 15, 2023, 22 pages.

Qi Specification, Wireless Power Consortium [online], Version 1.3, Jan. 2021, [retrieved May 21, 2024], Retrieved from the Internet: URL: https://www.wirelesspowerconsortium.com/knowledge-base/specifications/download-the-qi-specifications/, 746 pages.

* cited by examiner

HIGH SPEED DATA COMMUNICATIONS SYSTEM FOR INDUSTRIAL USE IN PACKAGED GOODS WITH OUT OF BAND COMMUNICATIONS HAND OFF

TECHNICAL FIELD

The present disclosure generally relates to systems and methods for manufacturing electronic devices, and, more particularly, to systems and methods for wirelessly transmitting software to such electronic devices, while the electronic devices are packaged.

BACKGROUND

Modern manufacturing of electronic devices involves a near infinite number of build, packaging, logistics, and/or software issues that can affect distribution of such products. Particularly in an increasingly global economy, devices may be manufactured in one region, but subsequently distributed and sold in another region, hundreds if not thousands of miles away from the manufacturing region of origin.

Additionally, same, physical products may require differing characteristics for different regions, such as languages in or on packaging or device software, region specific regulatory-based changes, among other regional characteristics. Often, same physical products are shipped to different regions with final finishing, packaging, and/or installation of software/firmware performed at a site different from the original manufacturing site.

When specifically considering software/firmware, current manufacturing methods require the manufacturer to physically connect the manufactured device to a transmitter of necessary updates or downloads of software/firmware for the device. Thus, if packaged, the electronic devices cannot receive software/firmware transmission without unpackaging the device or packaging it after the software/firmware is installed and/or updated.

SUMMARY

Thus, systems and methods for wirelessly updating and/or installing software/firmware of an electronic device, while the electronic device remains packaged, are desired. By utilizing an inductive wireless connection, via, for example, implementing a wireless power transfer system, data can be transferred through packaging to the device and software/firmware can be updated/installed while the electronic device remains in package. Due to the significant amount of power that can be transferred via near field magnetic coupling, the electronic device need not be fully or optimally powered, by, for example, its internal battery. Further, as a wireless power transfer system may have its own communications systems and methods external of the broader electronic device, it need not require functions of the electronic device to allow for connectivity validation. In contrast, using known wireless data connections (e.g., WiFi, Bluetooth, etc.) generally require the user of the electronic device to access control of the electronic device to validate the connection; thus, transmission of data via such means would not be possible while the electronic device remains in package.

Wireless connection systems are disclosed herein, where high speed, significant wireless data transfer is possible via near field magnetic induction. Such systems and methods may utilize virtualized wired connection protocols to simulate a wired connection and/or protocol for said high speed data transfer.

Wireless connection systems are used in a variety of applications for the wireless transfer of electrical energy, electrical power, electromagnetic energy, electrical data signals, among other known wirelessly transmittable signals. Such systems often use inductive wireless power transfer, which occurs when magnetic fields created by a transmitting element induce an electric field, and hence, an electric current, in a receiving element. These transmitting and receiving elements will often take the form of an antenna, such as coiled wires the like.

Transmission of one or more of electrical energy, electrical power, electromagnetic energy and/or electronic data signals from one of such coiled antennas to another, generally, operates at an operating frequency and/or an operating frequency range. The operating frequency may be selected for any of a variety of reasons, such as, but not limited to, power transfer efficiency characteristics, power level characteristics, self-resonant frequency restraints, design requirements, adherence to standards bodies' required characteristics (e.g. electromagnetic interference (EMI) requirements, specific absorption rate (SAR) requirements, among other things), bill of materials (BOM), and/or form factor constraints, among other things. It is to be noted that, "self-resonating frequency," as known to those having skill in the art, generally refers to the resonant frequency of a passive component (e.g., an inductor) due to the parasitic characteristics of the component.

When such systems are operating to wirelessly transfer power from a transmission system to a receiver system via the antennas, it is often desired to contemporaneously communicate electronic data between the systems. In some example systems, wireless-power-related communications (e.g., validation procedures, electronic characteristics data communications, voltage data, current data, device type data, among other contemplated data communications related to wireless power transfer) are performed using in-band communications.

However, currently implemented in-band communications may be limited to slow data rates (e.g., about 1-3 kilobytes per second) and, thus, may not be desirable for use in transmitting device-related data from a transmitter to a receiver, wherein the receiver is operatively associated with an electronic device. Additionally, currently implemented in-band communications are of a data type or protocol that may not be proper or acceptable for the transmission and receipt of the aforementioned device-related data.

Thus, in some devices, even if a wireless power transfer system is utilized for powering or charging the device, the communications speed over the inductive connection of the wireless power transfer system may be too slow for meaningful data transmission, outside of communications associated with wireless power transfer. In such devices, a wired connection may be necessary for faster data transmission or receipt.

A wireless power transfer system that utilizes data communications, systems, methods, and/or protocols, to replace a wired connection for communicating such device-related data and/or for wireless power related data, is desired. In such systems, it may be desired or required to continue the use of legacy communications protocols, which are utilized in wired communications, over a wireless connection. The systems and methods disclosed herein may be utilized to facilitate higher speed, one-way and/or two-way, data transfer during operations of a wireless power system, which may serve to replace a wired connection for performing such data transfer. Device-related data may include, but is not limited to including, operating software or firmware updates, digital media, operating instructions for the electronic device, among any other type of data outside of the realm of wireless-power-related data.

Such systems and methods for data communications, when utilized as part of a combined wireless power and wireless data system, may provide for much faster data communications, in comparison to legacy systems and methods for wireless power in-band communications.

In some examples, the wireless communications systems may utilize a buffered communications method, wherein data can be held in one or more buffers until the systems deems it is ready for communications. For instance, if one transceiver is attempting to pass a large amount of data, it may buffer such data until a point when the other side does not have a need to send data and then send the data at that point, which may allow communications to be accelerated since they can be sent "one way" over the virtual "wire" created by the inductive connection. Therefore, while such electromagnetic communications are not literally "two-way" communications utilizing two wires, virtual two-way communications are executable over the single inductive connection between the transmitter and receiver.

By utilizing buffers and the ability of both the transmitter and the receiver to encode data into the wireless power signal transmitted over the inductive connection between their respective antennas, such combinations of hardware and software may simulate the two-wire connections. Thus, the systems and methods disclosed herein may be implemented to provide a virtual serial and/or virtual universal asynchronous receiver-transmitter (UART) data communications system, method, or protocol, for data transfer during wireless power transfer.

In contrast to wired serial data transmission systems such as UART, the systems and methods disclosed herein advantageously eliminate the need for a wired connection between communicating devices, while enabling data communications that are interpretable by legacy systems that utilize known data protocols, such as UART. Further, in some examples, the systems and methods disclosed herein may enable manufacturers of such legacy-compatible systems to quickly introduce wireless data and/or power connections between devices, without needing to fully reprogram their data protocols and/or without having to hinder interoperability between devices.

Further, while in band virtualized communications are often sufficient for proper wireless data transfer, in some examples handing off data communications to an out of band communications system (e.g. a Bluetooth communications system) may be advantageous. In some such examples, when the wireless power and data system has properly powered a load of the electronic device that is receiving power, such systems may hand off data transfer to respective out of band communications systems associated with the wireless transmission system and wireless receiver system. Such hand off of data transfer may be advantageous in improving power transfer performance and/or improving speed and/or fidelity of wireless data transmission.

In accordance with an aspect of the disclosure, a method for providing an electronic device is disclosed. The method includes manufacturing the electronic device at a manufacturing location, wherein manufacturing the electronic device includes connecting a wireless receiver system to the electronic device. The method further includes packaging the electronic device at a packaging location. The method further includes wirelessly transmitting data to the electronic device at a data transmission site, wherein wirelessly transmitting the data to the electronic device is performed by transferring data via near field magnetic induction utilizing a wireless transmission system and transmitting data via an out of band communications system, the wireless transmission system configured to magnetically connect with the wireless receiver system associated with the electronic device.

In a refinement, one or both of the manufacturing location and the packaging location are sites independent of the data transmission site.

In a refinement, the data is one or more of a software update, a firmware update, a software application, a firmware, or combinations thereof.

In a further refinement, the data is specific to a region, within which the electronic device is provided.

In another further refinement, the data is transferred as an asynchronous serial data signal in accordance with a wireless data transfer protocol.

In yet a further refinement, the method further includes wirelessly transmitting electrical power signals for powering a load associated with the electronic device, utilizing a connection between the wireless transmission system and the wireless receiver system.

In a refinement, wirelessly transmitting data to the electronic device includes determining, by the wireless transmission system, presence of a wireless receiver system, starting wireless power and data transfer via the wireless transmission system, if presence of the wireless receiver system is detected, determining if power at a load associated with the wireless receiver system exceeds a threshold for out of band communications, and if the power at the load exceeds the threshold for out of band communications, handing over wireless data transfer to the out of band communications system, which is in operative communication with the wireless transmission system.

In a further refinement, wirelessly transmitting data further includes, if the power at the load exceeds the threshold for out of band communications, authorizing out of band communications with the out of band communications system, prior to handing over the wireless data transfer to the out of band communications system.

In yet a further refinement, authorizing out of band communications with the out of band communications system includes sending an out of band communications request to a receiver out of band communications system associated with the wireless receiver system.

In yet a further refinement, authorizing out of band communications with the out of band communications system includes receiving a communications address associated with the wireless receiver system, in response to the out of band communications request.

In yet a further refinement, the communications address is a media access control address (MAC address) associated with the wireless receiver system.

In yet another further refinement, the authorizing out of band communications with the out of band communications system includes connecting the out of band communications system with the receiver out of band communications system via the communications address.

In a further refinement, the out of band communications system and the receiver out of band communications systems are Bluetooth communications systems.

In a further refinement, wirelessly transmitting data further includes halting out of band data transfer, when a data transfer operation is complete.

In a further refinement, wirelessly transmitting data further includes continuing transfer of wireless power related data, via the wireless transmission system, after the wireless data transfer is handed over to the out of band communications system.

In accordance with another aspect of the disclosure, a method of operating a wireless power and data transfer system through commercial packaging is disclosed. The method includes determining, by a wireless transmission system, presence of a wireless receiver system. The method further includes starting wireless power and data transfer via the wireless transmission system, if presence of the wireless receiver system is detected. The method further includes determining if power at a load associated with the wireless receiver system exceeds a threshold for out of band communications. The method further includes, if the power at the load exceeds the threshold for out of band communications, handing over wireless data transfer to an out of band communications system that is in operative communication with the wireless transmission system.

In a refinement, the method further includes, if the power at the load exceeds the threshold for out of band communications, authorizing out of band communications with the out of band communications system, prior to handing over the wireless data transfer to the out of band communications system.

In a refinement, the out of band communications system and the receiver out of band communications systems are Bluetooth communications systems.

In a refinement, the method further includes halting out of band data transfer, when a data transfer operation is complete.

In a refinement, the method further includes continuing transfer of wireless power related data, via the wireless transmission system, after the wireless data transfer is handed over to the out of band communications system.

These and other aspects and features of the present disclosure will be better understood when read in conjunction with the accompanying drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto. Additional, different, or fewer components and methods may be included in the systems and methods.

DETAILED DESCRIPTION

In the following description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings. For example, as noted above, UART is used herein as an example asynchronous communication scheme, and the NFC protocols are used as example synchronous communications scheme. However, other wired and wireless communications techniques may be used while embodying the principles of the present disclosure.

Figure 2:
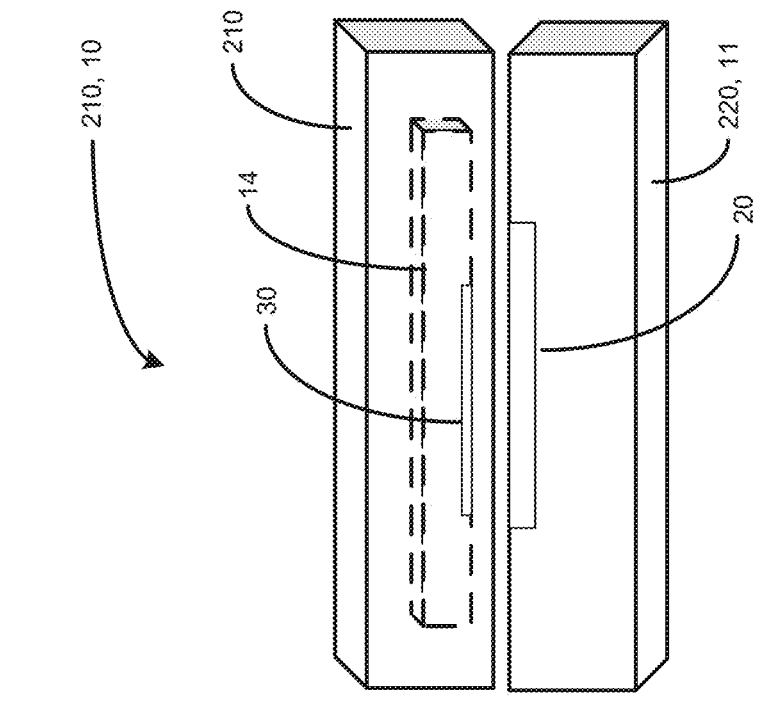
FIG. 2 is a side view of a system for transferring data to an electronic device while it remains in package, in accordance with FIG. 1 and the present disclosure.
Figure 1:
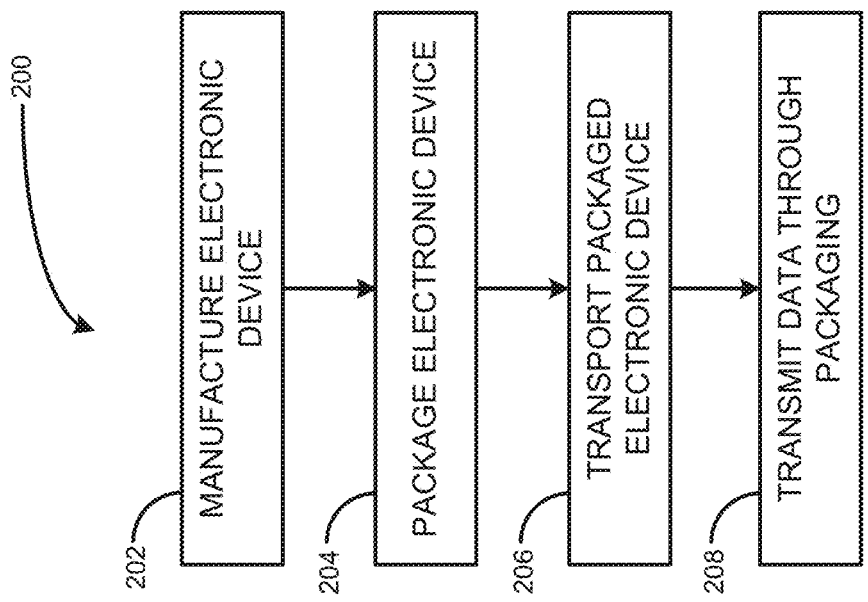
FIG. 1 is a flowchart for a method for providing an electronic device that utilizes transmission of data through packaging, in accordance with the present disclosure.

Referring now to the drawings and with specific reference to FIGS. 1 and 2, a flowchart for a method 200 for providing an electronic device is illustrated in FIG. 1 and a system 210 for performing a portion of the method 200 is illustrated in FIG. 2. The method begins at block 202, wherein the electronic device 14, itself, is manufactured. The manufacturing of said electronic device 14 may include installing, integrating, or otherwise connecting the electronic device 14 with an internal or external wireless receiver system 30, which is described in more detail below. Manufacture of the electronic device 14 may be any known methods or steps of manufacturing a specific device known in the art. The manufacturing of the electronic device 202 may be performed at a manufacturing location, which may be a factory, facility, lab, and/or any other known place for production in any location worldwide.

The electronic device 14 may be any device capable of receipt of electronically transmissible data. For example, the device may be, but is not limited to being, a handheld computing device, a mobile device, a portable appliance, an integrated circuit, an identifiable tag, a kitchen utility device, an electronic tool, an electric vehicle, a game console, a robotic device, a wearable electronic device (e.g., an electronic watch, electronically modified glasses, altered-reality (AR) glasses, virtual reality (VR) glasses, among other things), a portable scanning device, a portable identifying device, a sporting good, an embedded sensor, an Internet of Things (IoT) sensor, IoT enabled clothing, IoT enabled recreational equipment, industrial equipment, medical equipment, a medical device, a tablet computing device, a portable control device, a remote controller for an electronic device, a gaming controller, among other things.

After the device is manufactured, the electronic device 14 may then be packaged in packaging materials 210, as illustrated in block 204. The packaging materials 210 may be any packaging materials known in the art, such as, but not limited to, boxes, bags, formed plastic, formed cardboard or other paper products, a device receptacle, support structures within a receptacle, among other known packaging. Packaging of the electronic device 14 may be performed at a packaging location. The packaging location may be the same or proximate to the manufacturing location or, alternatively, the packaging location may be a location independent of the manufacturing location, such as a location in a foreign country or at a site far from the manufacturing site.

In some examples, the packaged electronic device 14 may then be transported to a data transmission site, as illustrated in block 206. However, block 206 is optional and the data transmission site may be a common or proximate location, with respect to one or both of the manufacturing location and the packaging location.

Block 208 is a step of transmitting data through the packaging 210, to the electronic device 14, by utilizing a wireless transmission system 20 and/or an out of band communications system 72 associated with a data transmitter 220. The data transmitter 220 may be any computing device that is capable of providing software or firmware to the electronic device 14, through the packaging 210. The electronic device 14 receives the software/firmware, as wireless data signals transmitted by the wireless transmission system of the data transmitter 220, to a wireless receiver system 30 of or associated with the electronic device 14. Further description of the system 10, the wireless transmission system 20, and the wireless receiver system 30 is provided below.

By utilizing the systems 20, 30 to wirelessly transmit software/firmware through the packaging 210, the systems and methods disclosed herein may be utilized for a variety of manufacturing and/or logistics advantages. For example, if a product is manufactured and packaged at a central location, the products can then be sent to multiple regions, wherein multiple regions require multiple, respective, software/firmware experiences. In such examples, the use of through package data transfer can be utilized to update a product for the region or country of sale, at a local distributor and, thus, logistics are simplified at the originating facility, as they do not need to organize manufactured/packaged products by region.

Additionally or alternatively, utilizing the aforementioned systems and methods are useful in improving user experience for the end user of the electronic device 14. Often, electronics are provided to the end user with out-of-date software or firmware, requiring the user to connect the device to a network for an update prior to use or prior to optimal use. Alternatively, utilizing the systems and methods disclosed herein, the software/firmware of the electronic device 14 may be kept up-to-date, via in-package data transfer, at one or more of an originating facility, a regional warehouse or storage facility, a local store that sells the electronic device 14, among other known points of distribution in a supply chain for the electronic device 14.

Figure 3:
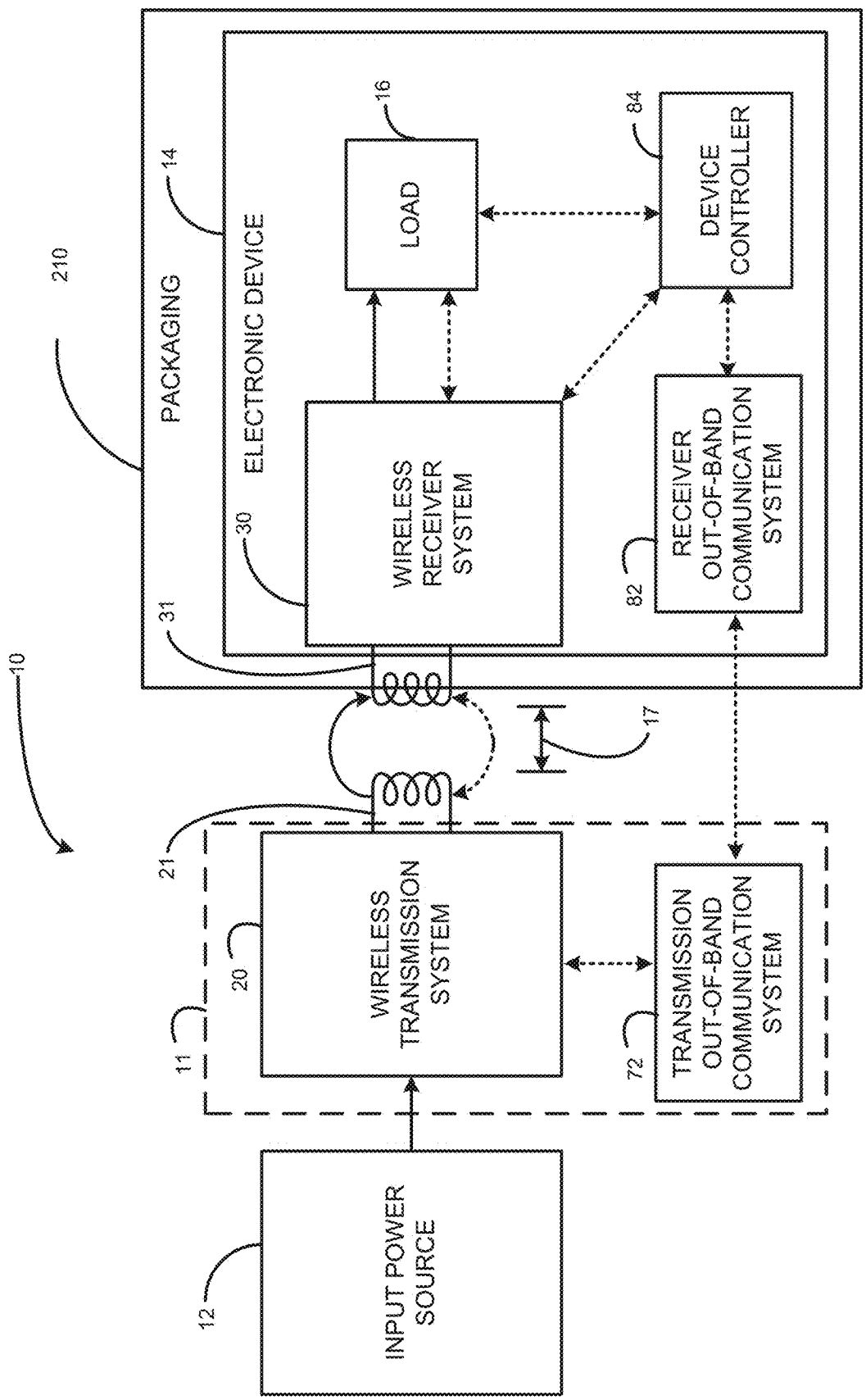
FIG. 3 is a block diagram of an embodiment of a system for wirelessly transferring one or more of electrical energy, electrical power signals, electrical power, electromagnetic energy, electronic data, and combinations thereof, in accordance with the present disclosure.

Turning to FIG. 3, a wireless power transfer system 10 is illustrated. The wireless power transfer system 10 provides for the wireless transmission of electrical signals, such as, but not limited to, electrical energy, electrical power, electrical power signals, electromagnetic energy, and electronically transmittable data ("electronic data"). As used herein, the term "electrical power signal" refers to an electrical signal transmitted specifically to provide meaningful electrical energy for charging and/or directly powering a load, whereas the term "electronic data signal" refers to an electrical signal that is utilized to convey data across a medium.

The wireless power transfer system 10 provides for the wireless transmission of electrical signals via near field magnetic coupling. As shown in the embodiment of FIG. 1, the wireless power transfer system 10 includes a wireless transmission system 20 and a wireless receiver system 30. The wireless receiver system is configured to receive electrical signals from, at least, the wireless transmission system 20. In some examples, such as examples wherein the wireless power transfer system is configured for wireless power transfer via the Near Field Communications Direct Charge (NFC-DC) or Near Field Communications Wireless Charging (NFC WC) draft or accepted standard, the wireless transmission system 20 may be referenced as a "listener" of the NFC-DC wireless transfer system 20 and the wireless receiver system 30 may be referenced as a "poller" of the NFC-DC wireless transfer system.

As illustrated, the wireless transmission system 20 and wireless receiver system 30 may be configured to transmit electrical signals across, at least, a separation distance or gap 17. A separation distance or gap, such as the gap 17, in the context of a wireless power transfer system, such as the system 10, does not include a physical connection, such as a wired connection. There may be intermediary objects located in a separation distance or gap, such as, but not limited to, air, a counter top, a casing for an electronic device, a plastic filament, an insulator, a mechanical wall, among other things; however, there is no physical, electrical connection at such a separation distance or gap.

Thus, the combination of the wireless transmission system 20 and the wireless receiver system 30 create an electrical connection without the need for a physical connection. As used herein, the term "electrical connection" refers to any facilitation of a transfer of an electrical current, voltage, and/or power from a first location, device, component, and/or source to a second location, device, component, and/or destination. An "electrical connection" may be a physical connection, such as, but not limited to, a wire, a trace, a via, among other physical electrical connections, connecting a first location, device, component, and/or source to a second location, device, component, and/or destination. Additionally or alternatively, an "electrical connection" may be a wireless power and/or data transfer, such as, but not limited to, magnetic, electromagnetic, resonant, and/or inductive field, among other wireless power and/or data transfers, connecting a first location, device, component, and/or source to a second location, device, component, and/or destination.

In some cases, the gap 17 may also be referenced as a "Z-Distance," because, if one considers an antenna 21, 31 each to be disposed substantially along respective common X-Y planes, then the distance separating the antennas 21, 31 is the gap in a "Z" or "depth" direction. However, flexible and/or non-planar coils are certainly contemplated by embodiments of the present disclosure and, thus, it is contemplated that the gap 17 may not be uniform, across an envelope of connection distances between the antennas 21, 31. It is contemplated that various tunings, configurations, and/or other parameters may alter the possible maximum distance of the gap 17, such that electrical transmission from the wireless transmission system 20 to the wireless receiver system 30 remains possible.

The wireless power transfer system 10 operates when the wireless transmission system 20 and the wireless receiver system 30 are coupled. As used herein, the terms "couples," "coupled," and "coupling" generally refer to magnetic field coupling, which occurs when a transmitter and/or any components thereof and a receiver and/or any components thereof are coupled to each other through a magnetic field. Such coupling may include coupling, represented by a coupling coefficient (k), that is at least sufficient for an induced electrical power signal, from a transmitter, to be harnessed by a receiver. Coupling of the wireless transmission system 20 and the wireless receiver system 30, in the system 10, may be represented by a resonant coupling coefficient of the system 10 and, for the purposes of wireless power transfer, the coupling coefficient for the system 10 may be in the range of about 0.01 and 0.9.

As illustrated, the wireless transmission system 20 may be associated with a host device 11, which may receive power from an input power source 12. The host device 11 may be any electrically operated device, circuit board, electronic assembly, dedicated charging device, or any other contemplated electronic device. Example host devices 11, with which the wireless transmission system 20 may be associated therewith, include, but are not limited to including, a device that includes an integrated circuit, cases for wearable electronic devices, receptacles for electronic devices, a portable computing device, clothing configured with electronics, storage medium for electronic devices, charging apparatus for one or multiple electronic devices, dedicated electrical charging devices, activity or sport related equipment, goods, and/or data collection devices, among other contemplated electronic devices.

As illustrated, one or both of the wireless transmission system 20 and the host device 11 are operatively associated with an input power source 12. The input power source 12 may be or may include one or more electrical storage devices, such as an electrochemical cell, a battery pack, and/or a capacitor, among other storage devices. Additionally or alternatively, the input power source 12 may be any electrical input source (e.g., any alternating current (AC) or direct current (DC) delivery port) and may include connection apparatus from said electrical input source to the wireless transmission system 20 (e.g., transformers, regulators, conductive conduits, traces, wires, or equipment, goods, computer, camera, mobile phone, and/or other electrical device connection ports and/or adaptors, such as but not limited to USB ports and/or adaptors, among other contemplated electrical components).

Electrical energy received by the wireless transmission system 20 is then used for at least two purposes: to provide electrical power to internal components of the wireless transmission system 20 and to provide electrical power to the transmitter antenna 21. The transmitter antenna 21 is configured to wirelessly transmit the electrical signals conditioned and modified for wireless transmission by the wireless transmission system 20 via near-field magnetic coupling (NFMC). Near-field magnetic coupling enables the transfer of signals wirelessly through magnetic induction between the transmitter antenna 21 and a receiving antenna 31 of, or associated with, the wireless receiver system 30. Near-field magnetic coupling may be and/or be referred to as "inductive coupling," which, as used herein, is a wireless power transmission technique that utilizes an alternating electromagnetic field to transfer electrical energy between two antennas. Such inductive coupling is the near field wireless transmission of magnetic energy between two magnetically coupled coils that are tuned to resonate at a similar frequency. Accordingly, such near-field magnetic coupling may enable efficient wireless power transmission via resonant transmission of confined magnetic fields. Further, such near-field magnetic coupling may provide connection via "mutual inductance," which, as defined herein is the production of an electromotive force in a circuit by a change in current in a second circuit magnetically coupled to the first.

In one or more embodiments, the inductor coils of either the transmitter antenna 21 or the receiver antenna 31 are strategically positioned to facilitate reception and/or transmission of wirelessly transferred electrical signals through near field magnetic induction. Antenna operating frequencies may comprise relatively high operating frequency ranges, examples of which may include, but are not limited to, 6.78 MHz (e.g., in accordance with the Rezence and/or Airfuel interface standard and/or any other proprietary interface standard operating at a frequency of 6.78 MHz), 13.56 MHz (e.g., in accordance with the NFC standard, defined by ISO/IEC standard 18092), 27 MHz, and/or an operating frequency of another proprietary operating mode. The operating frequencies of the antennas 21, 31 may be operating frequencies designated by the International Telecommunications Union (ITU) in the Industrial, Scientific, and Medical (ISM) frequency bands, including not limited to 6.78 MHz, 13.56 MHz, and 27 MHz, which are designated for use in wireless power transfer. In systems wherein the wireless power transfer system 10 is operating within the NFC-DC standards and/or draft standards, the operating frequency may be in a range of about 13.553 MHz to about 13.567 MHz.

The transmitting antenna and the receiving antenna of the present disclosure may be configured to transmit and/or receive electrical power having a magnitude that ranges from about 10 milliwatts (mW) to about 500 watts (W). In one or more embodiments the inductor coil of the transmitting antenna 21 is configured to resonate at a transmitting antenna resonant frequency or within a transmitting antenna resonant frequency band.

As known to those skilled in the art, a "resonant frequency" or "resonant frequency band" refers a frequency or frequencies wherein amplitude response of the antenna is at a relative maximum, or, additionally or alternatively, the frequency or frequency band where the capacitive reactance has a magnitude substantially similar to the magnitude of the inductive reactance. In one or more embodiments, the transmitting antenna resonant frequency is at a high frequency, as known to those in the art of wireless power transfer.

The wireless receiver system 30 may be associated with at least one electronic device 14, wherein the electronic device 14 may be any device that requires electrical power for any function and/or for power storage (e.g., via a battery and/or capacitor).

As illustrated, the wireless transmission system 20 and/or the wireless host device 11 may include or otherwise be operatively associated with a transmission out of band communications system 72. Additionally, as illustrated, the electronic device 14 may include or be otherwise operatively associated with a receiver out of band communications system 82. The out of band communications systems 72, 82 may be configured to communicate with one another over a wireless connection, independent of the inductive connection between the wireless transmission system 20 and the wireless receiver system 30. Example out of band communications systems include, but are not limited to, Bluetooth or Bluetooth Low Energy (BLE) wireless communication systems, WiFi communications systems, Zigbee communications systems, radio frequency (RF) communications systems, and/or any other known wireless communications systems.

In some examples, the electronic device 14 includes a device controller 84, which may be any electronic controller or computing system that includes, at least, a processor which performs operations, executes control algorithms, stores data, retrieves data, gathers data, controls and/or provides communication with other components and/or subsystems associated with the electronic device 84, and/or performs any other computing or controlling task desired. The device controller 84 may be a single controller or may include more than one controller disposed to control various functions and/or features of the electronic device 14. Functionality of the device controller 84 may be implemented in hardware and/or software and may rely on one or more data maps relating to the operation of the electronic device 14. To that end, the device controller 84 may be operatively associated memory. The memory may include one or more of internal memory, external memory, and/or remote memory (e.g., a database and/or server operatively connected to the device controller 84 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory machine readable and/or computer readable memory media.

The device controller 84 may be configured to communicate information associated with the load 16. In some examples, the device controller 84 may be configured to determine and/or provide information associated with a capacity and/or power or charge level of the load 16. Accordingly, in some examples wherein the load 16 is or includes a battery, the device controller 84 may determine or provide information associated with the power level, charge level, and/or charge percentage of said battery. In such examples, the device controller 84 may include one or more power management integrated circuits (PMICs). Further, the receiver out of band communication system 82 and the wireless receiver system 30 may communicate with the device controller 84, for the purposes of transmitting and/or receiving data. Additionally or alternatively, such communication amongst systems may be utilized in managing data transfer based, at least, on a power level of the load 16.

For the purposes of illustrating the features and characteristics of the disclosed embodiments, arrow-ended lines are utilized to illustrate transferrable and/or communicative signals and various patterns are used to illustrate electrical signals that are intended for power transmission and electrical signals that are intended for the transmission of data and/or control instructions. Solid lines indicate signal transmission of electrical energy over a physical and/or wireless power transfer, in the form of power signals that are, ultimately, utilized in wireless power transmission from the wireless transmission system 20 to the wireless receiver system 30. Further, dotted lines are utilized to illustrate electronically transmittable data signals, which ultimately may be wirelessly transmitted from the wireless transmission system 20 to the wireless receiver system 30.

While the systems and methods herein illustrate the transmission of wirelessly transmitted energy, wireless power signals, wirelessly transmitted power, wirelessly transmitted electromagnetic energy, and/or electronically transmittable data, it is certainly contemplated that the systems, methods, and apparatus disclosed herein may be utilized in the transmission of only one signal, various combinations of two signals, or more than two signals and, further, it is contemplated that the systems, method, and apparatus disclosed herein may be utilized for wireless transmission of other electrical signals in addition to or uniquely in combination with one or more of the above mentioned signals. In some examples, the signal paths of solid or dotted lines may represent a functional signal path, whereas, in practical application, the actual signal is routed through additional components en route to its indicated destination. For example, it may be indicated that a data signal routes from a communications apparatus to another communications apparatus; however, in practical application, the data signal may be routed through an amplifier, then through a transmission antenna, to a receiver antenna, where, on the receiver end, the data signal is decoded by a respective communications device of the receiver.

Figure 4:
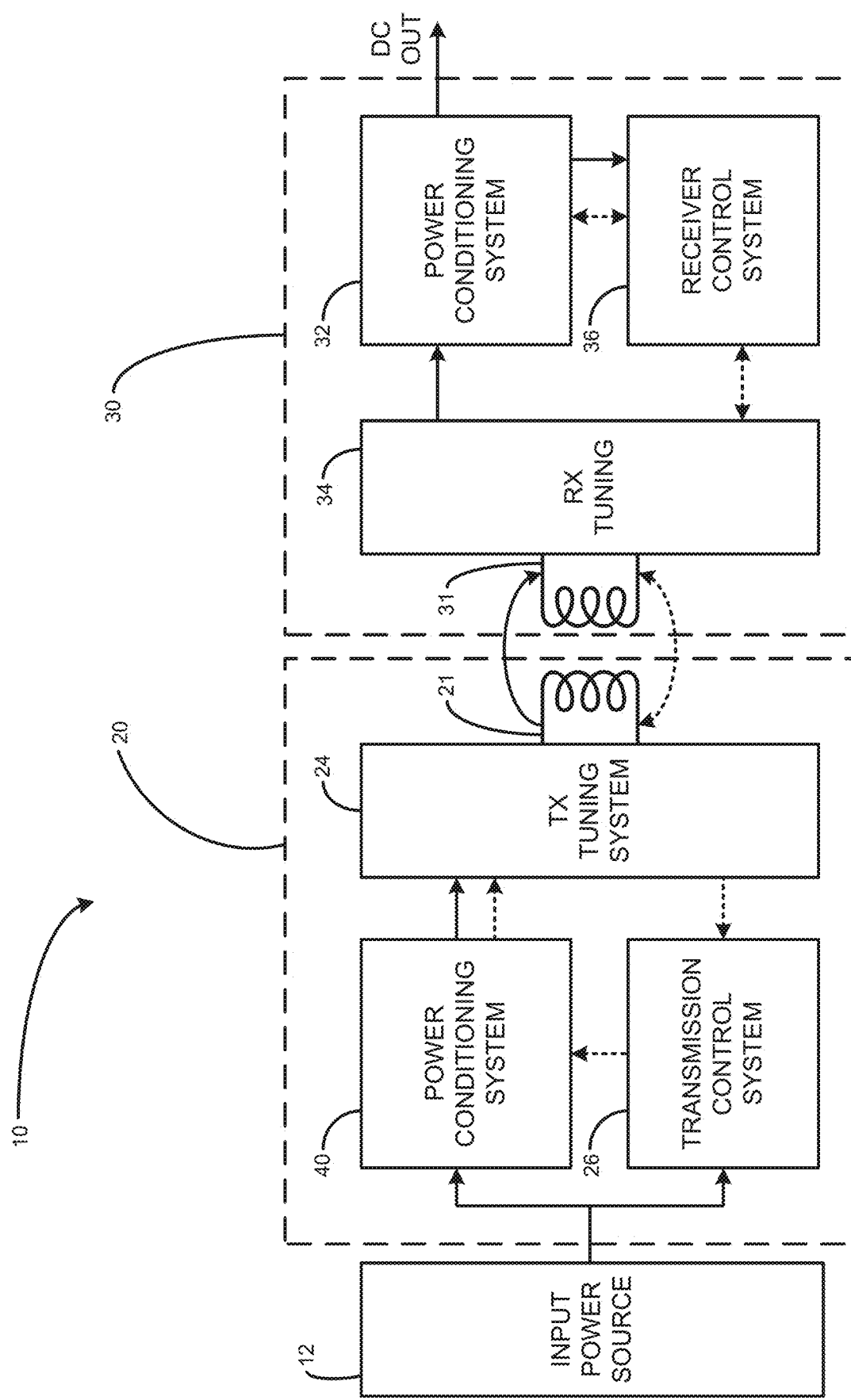
FIG. 4 is a block diagram illustrating components of a wireless transmission system of the system of FIG. 3 and a wireless receiver system of the system of FIG. 3, in accordance with FIG. 1 and the present disclosure.

Turning now to FIG. 4, the wireless connection system 10 is illustrated as a block diagram including example subsystems of both the wireless transmission system 20 and the wireless receiver system 30. The wireless transmission system 20 may include, at least, a power conditioning system 40, a transmission control system 26, a transmission tuning system 24, and the transmission antenna 21. A first portion of the electrical energy input from the input power source 12 is configured to electrically power components of the wireless transmission system 20 such as, but not limited to, the transmission control system 26. A second portion of the electrical energy input from the input power source 12 is conditioned and/or modified for wireless power transmission, to the wireless receiver system 30, via the transmission antenna 21. Accordingly, the second portion of the input energy is modified and/or conditioned by the power conditioning system 40. While not illustrated, it is certainly contemplated that one or both of the first and second portions of the input electrical energy may be modified, conditioned, altered, and/or otherwise changed prior to receipt by the power conditioning system 40 and/or transmission control system 26, by further contemplated subsystems (e.g., a voltage regulator, a current regulator, switching systems, fault systems, safety regulators, among other things).

Figure 5:
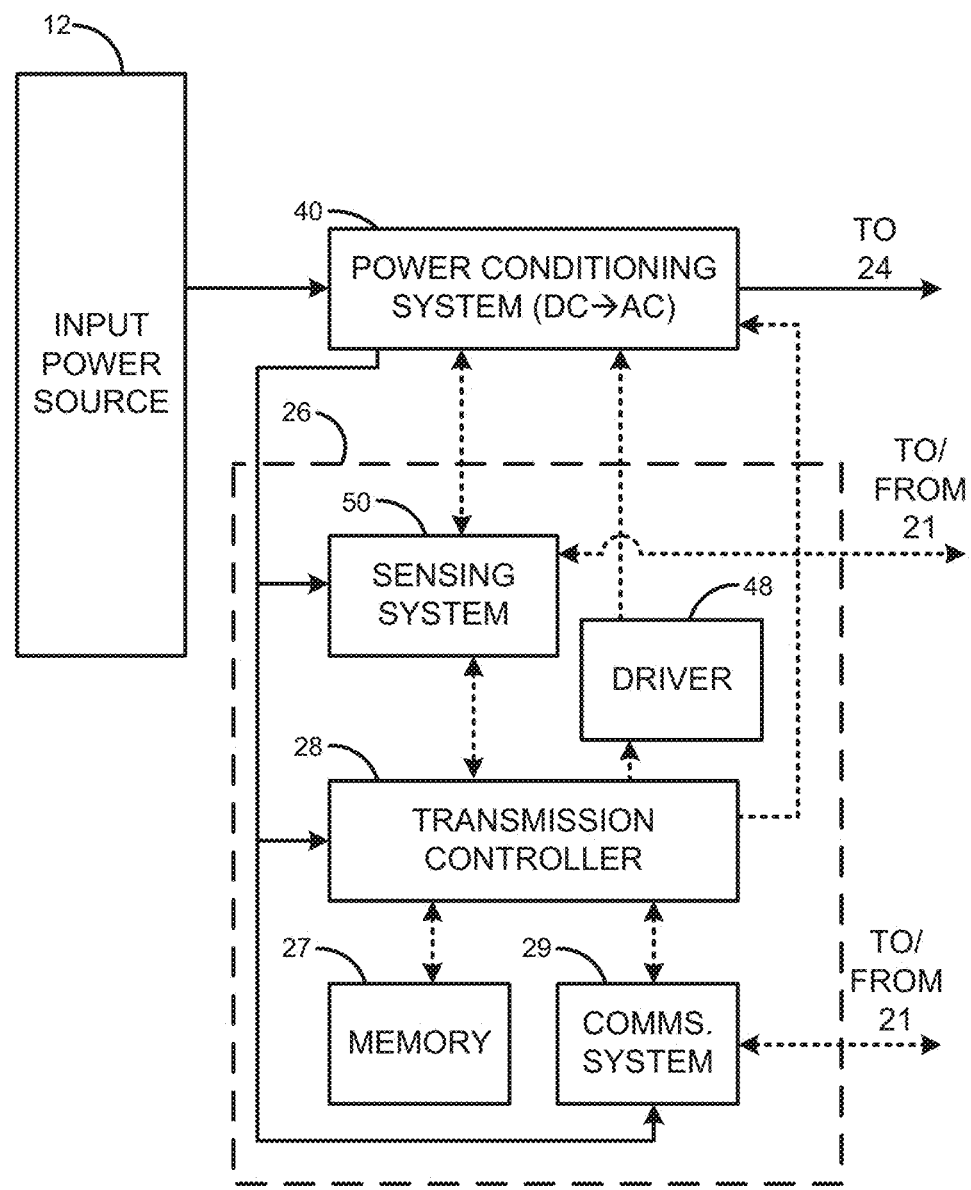
FIG. 5 is a block diagram illustrating components of a transmission control system of the wireless transmission system of FIG. 4, in accordance with FIG. 3, FIG. 4, and the present disclosure.

Referring now to FIG. 5, with continued reference to FIGS. 3 and 4, subcomponents and/or systems of the transmission control system 26 are illustrated. The transmission control system 26 may include a sensing system 50, a transmission controller 28, a communications system 29, a driver 48, and a memory 27.

The transmission controller 28 may be any electronic controller or computing system that includes, at least, a processor which performs operations, executes control algorithms, stores data, retrieves data, gathers data, controls and/or provides communication with other components and/or subsystems associated with the wireless transmission system 20, and/or performs any other computing or controlling task desired. The transmission controller 28 may be a single controller or may include more than one controller disposed to control various functions and/or features of the wireless transmission system 20. Functionality of the transmission controller 28 may be implemented in hardware and/or software and may rely on one or more data maps relating to the operation of the wireless transmission system 20. To that end, the transmission controller 28 may be operatively associated with the memory 27. The memory may include one or more of internal memory, external memory, and/or remote memory (e.g., a database and/or server operatively connected to the transmission controller 28 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory machine readable and/or computer readable memory media.

While particular elements of the transmission control system 26 are illustrated as independent components and/or circuits (e.g., the driver 48, the memory 27, the communications system 29, the sensing system 50, among other contemplated elements) of the transmission control system 26, such components may be integrated with the transmission controller 28. In some examples, the transmission controller 28 may be an integrated circuit configured to include functional elements of one or both of the transmission controller 28 and the wireless transmission system 20, generally.

Prior to providing data transmission and receipt details, it should be noted that either of the wireless transmission system 20 and the wireless receiver system 30 may send data to the other within the disclosed principles, regardless of which entity is wirelessly sending or wirelessly receiving power. As illustrated, the transmission controller 28 is in operative association, for the purposes of data transmission, receipt, and/or communication, with, at least, the memory 27, the communications system 29, the power conditioning system 40, the driver 48, and the sensing system 50. The driver 48 may be implemented to control, at least in part, the operation of the power conditioning system 40. In some examples, the driver 48 may receive instructions from the transmission controller 28 to generate and/or output a generated pulse width modulation (PWM) signal to the power conditioning system 40. In some such examples, the PWM signal may be configured to drive the power conditioning system 40 to output electrical power as an alternating current signal, having an operating frequency defined by the PWM signal. In some examples, PWM signal may be configured to generate a duty cycle for the AC power signal output by the power conditioning system 40. In some such examples, the duty cycle may be configured to be about 50% of a given period of the AC power signal.

The sensing system may include one or more sensors, wherein each sensor may be operatively associated with one or more components of the wireless transmission system 20 and configured to provide information and/or data. The term "sensor" is used in its broadest interpretation to define one or more components operatively associated with the wireless transmission system 20 that operate to sense functions, conditions, electrical characteristics, operations, and/or operating characteristics of one or more of the wireless transmission system 20, the wireless receiving system 30, the input power source 12, the host device 11, the transmission antenna 21, the receiver antenna 31, along with any other components and/or subcomponents thereof. Again, while the examples may illustrate a certain configuration, it should be appreciated that either of the wireless transmission system 20 and the wireless receiver system 30 may send data to the other within the disclosed principles, regardless of which entity is wirelessly sending or wirelessly receiving power.

Figure 6:
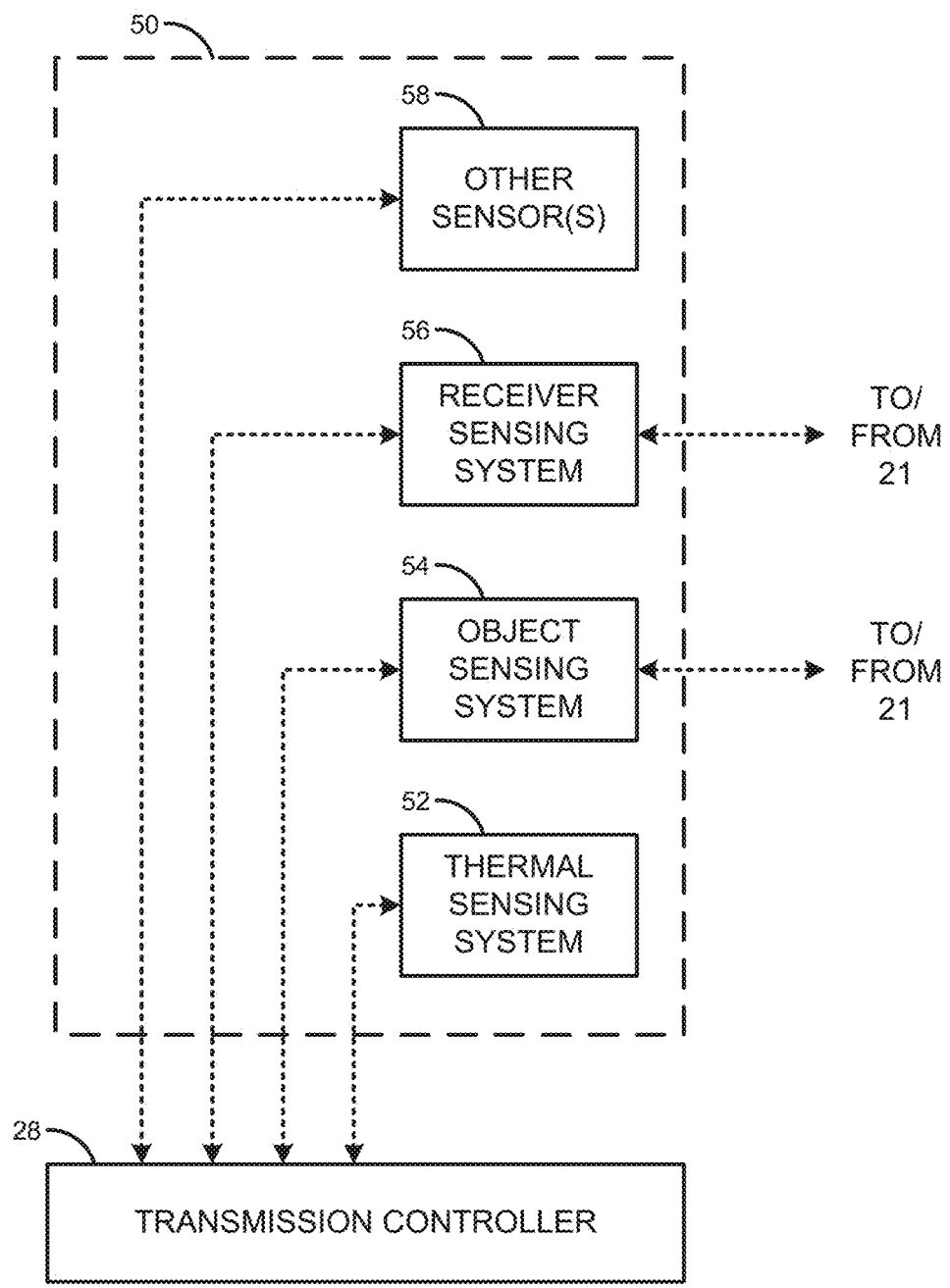
FIG. 6 is a block diagram illustrating components of a sensing system of the transmission control system of FIG. 5, in accordance with FIGS. 1-3 and the present disclosure.

As illustrated in the embodiment of FIG. 6, the sensing system 50 may include, but is not limited to including, a thermal sensing system 52, an object sensing system 54, a receiver sensing system 56, and/or any other sensor(s) 58. Within these systems, there may exist even more specific optional additional or alternative sensing systems addressing particular sensing aspects required by an application, such as, but not limited to: a condition-based maintenance sensing system, a performance optimization sensing system, a state-of-charge sensing system, a temperature management sensing system, a component heating sensing system, an IoT sensing system, an energy and/or power management sensing system, an impact detection sensing system, an electrical status sensing system, a speed detection sensing system, a device health sensing system, among others. The object sensing system 54, may be a foreign object detection (FOD) system.

Each of the thermal sensing system 52, the object sensing system 54, the receiver sensing system 56 and/or the other sensor(s) 58, including the optional additional or alternative systems, are operatively and/or communicatively connected to the transmission controller 28. The thermal sensing system 52 is configured to monitor ambient and/or component temperatures within the wireless transmission system 20 or other elements nearby the wireless transmission system 20. The thermal sensing system 52 may be configured to detect a temperature within the wireless transmission system 20 and, if the detected temperature exceeds a threshold temperature, the transmission controller 28 prevents the wireless transmission system 20 from operating. Such a threshold temperature may be configured for safety considerations, operational considerations, efficiency considerations, and/or any combinations thereof. In a non-limiting example, if, via input from the thermal sensing system 52, the transmission controller 28 determines that the temperature within the wireless transmission system 20 has increased from an acceptable operating temperature to an undesired operating temperature (e.g., in a non-limiting example, the internal temperature increasing from about 20° Celsius (C) to about 50° C., the transmission controller 28 prevents the operation of the wireless transmission system 20 and/or reduces levels of power output from the wireless transmission system 20. In some non-limiting examples, the thermal sensing system 52 may include one or more of a thermocouple, a thermistor, a negative temperature coefficient (NTC) resistor, a resistance temperature detector (RTD), and/or any combinations thereof.

As depicted in FIG. 6, the transmission sensing system 50 may include the object sensing system 54. The object sensing system 54 may be configured to detect one or more of the wireless receiver system 30 and/or the receiver antenna 31, thus indicating to the transmission controller 28 that the receiver system 30 is proximate to the wireless transmission system 20. Additionally or alternatively, the object sensing system 54 may be configured to detect presence of unwanted objects in contact with or proximate to the wireless transmission system 20. In some examples, the object sensing system 54 is configured to detect the presence of an undesired object. In some such examples, if the transmission controller 28, via information provided by the object sensing system 54, detects the presence of an undesired object, then the transmission controller 28 prevents or otherwise modifies operation of the wireless transmission system 20. In some examples, the object sensing system 54 utilizes an impedance change detection scheme, in which the transmission controller 28 analyzes a change in electrical impedance observed by the transmission antenna 20 against a known, acceptable electrical impedance value or range of electrical impedance values.

Additionally or alternatively, the object sensing system 54 may utilize a quality factor (Q) change detection scheme, in which the transmission controller 28 analyzes a change from a known quality factor value or range of quality factor values of the object being detected, such as the receiver antenna 31.

The "quality factor" or "Q" of an inductor can be defined as (frequency (Hz)×inductance (H))/resistance (ohms), where frequency is the operational frequency of the circuit, inductance is the inductance output of the inductor and resistance is the combination of the radiative and reactive resistances that are internal to the inductor. "Quality factor," as defined herein, is generally accepted as an index (figure of measure) that measures the efficiency of an apparatus like an antenna, a circuit, or a resonator. In some examples, the object sensing system 54 may include one or more of an optical sensor, an electro-optical sensor, a Hall effect sensor, a proximity sensor, and/or any combinations thereof.

The receiver sensing system 56 is any sensor, circuit, and/or combinations thereof configured to detect presence of any wireless receiving system that may be couplable with the wireless transmission system 20. In some examples, the receiver sensing system 56 and the object sensing system 54 may be combined, may share components, and/or may be embodied by one or more common components. In some examples, if the presence of any such wireless receiving system is detected, wireless transmission of electrical energy, electrical power, electromagnetic energy, and/or data by the wireless transmission system 20 to said wireless receiving system is enabled. In some examples, if the presence of a wireless receiver system is not detected, continued wireless transmission of electrical energy, electrical power, electromagnetic energy, and/or data is prevented from occurring. Accordingly, the receiver sensing system 56 may include one or more sensors and/or may be operatively associated with one or more sensors that are configured to analyze electrical characteristics within an environment of or proximate to the wireless transmission system 20 and, based on the electrical characteristics, determine presence of a wireless receiver system 30.

Figure 7:
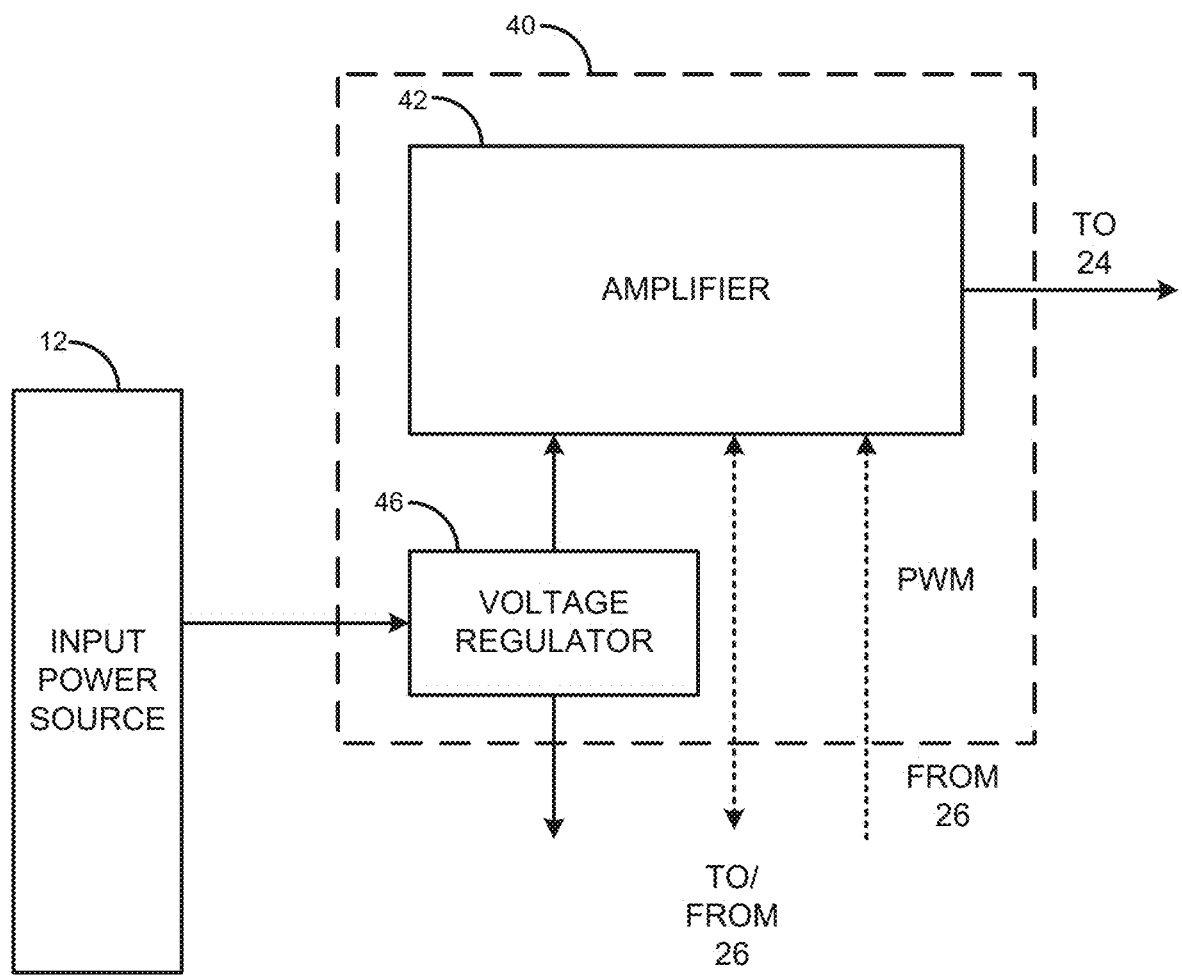
FIG. 7 is a block diagram illustrating components of a power conditioning system of the wireless transmission system of FIG. 4, in accordance with FIG. 3, FIG. 4, and the present disclosure.

Referring now to FIG. 7, and with continued reference to FIGS. 1-6, a block diagram illustrating an embodiment of the power conditioning system 40 is illustrated. At the power conditioning system 40, electrical power is received, generally, as a DC power source, via the input power source 12 itself or an intervening power converter, converting an AC source to a DC source (not shown). A voltage regulator 46 receives the electrical power from the input power source 12 and is configured to provide electrical power for transmission by the antenna 21 and provide electrical power for powering components of the wireless transmission system 21. Accordingly, the voltage regulator 46 is configured to convert the received electrical power into at least two electrical power signals, each at a proper voltage for operation of the respective downstream components: a first electrical power signal to electrically power any components of the wireless transmission system 20 and a second portion conditioned and modified for wireless transmission to the wireless receiver system 30. As illustrated in FIG. 3, such a first portion is transmitted to, at least, the sensing system 50, the transmission controller 28, and the communications system 29; however, the first portion is not limited to transmission to just these components and can be transmitted to any electrical components of the wireless transmission system 20.

The second portion of the electrical power is provided to an amplifier 42 of the power conditioning system 40, which is configured to condition the electrical power for wireless transmission by the antenna 21. The amplifier may function as an inverter, which receives an input DC power signal from the voltage regulator 46 and generates an AC as output, based, at least in part, on PWM input from the transmission control system 26. The amplifier 42 may be or include, for example, a power stage invertor, such as a dual field effect transistor power stage invertor or a quadruple field effect transistor power stage invertor. The use of the amplifier 42 within the power conditioning system 40 and, in turn, the wireless transmission system 20 enables wireless transmission of electrical signals having much greater amplitudes than if transmitted without such an amplifier. For example, the addition of the amplifier 42 may enable the wireless transmission system 20 to transmit electrical energy as an electrical power signal having electrical power from about 10 mW to about 500 W. In some examples, the amplifier 42 may be or may include one or more class-E power amplifiers. Class-E power amplifiers are efficiently tuned switching power amplifiers designed for use at high frequencies (e.g., frequencies from about 1 MHz to about 1 GHz). Generally, a class-E amplifier employs a single-pole switching element and a tuned reactive network between the switch and an output load (e.g., the antenna 21). Class E amplifiers may achieve high efficiency at high frequencies by only operating the switching element at points of zero current (e.g., on-to-off switching) or zero voltage (off to on switching). Such switching characteristics may minimize power lost in the switch, even when the switching time of the device is long compared to the frequency of operation. However, the amplifier 42 is certainly not limited to being a class-E power amplifier and may be or may include one or more of a class D amplifier, a class EF amplifier, an H invertor amplifier, and/or a push-pull invertor, among other amplifiers that could be included as part of the amplifier 42.

Figure 9:
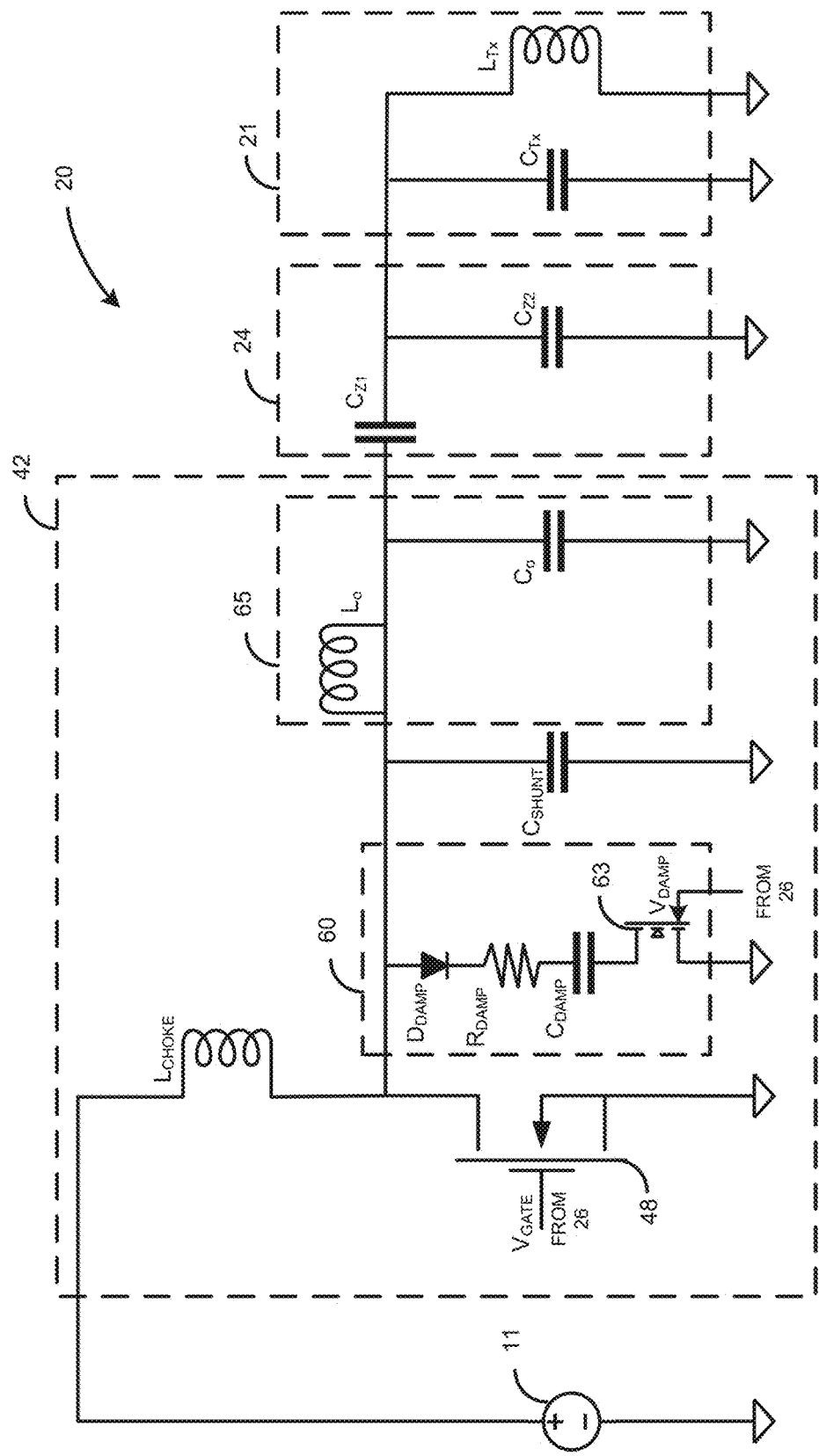
FIG. 9 is an electrical schematic diagram of elements of the wireless transmission system of FIGS. 1-8, further illustrating components of an amplifier of the power conditioning system of FIGS. 7-8, in accordance with FIGS. 1-8 and the present disclosure.

Turning now to FIGS. 6 and 7, the wireless transmission system 20 is illustrated, further detailing elements of the power conditioning system 40, the amplifier 42, the tuning system 24, among other things. The block diagram of the wireless transmission system 20 illustrates one or more electrical signals and the conditioning of such signals, altering of such signals, transforming of such signals, inverting of such signals, amplification of such signals, and combinations thereof. In FIG. 6, DC power signals are illustrated with heavily bolded lines, such that the lines are significantly thicker than other solid lines in FIG. 6 and other figures of the instant application, AC signals are illustrated as substantially sinusoidal wave forms with a thickness significantly less bolded than that of the DC power signal bolding, and data signals are represented as dotted lines. It is to be noted that the AC signals are not necessarily substantially sinusoidal waves and may be any AC waveform suitable for the purposes described below (e.g., a half sine wave, a square wave, a half square wave, among other waveforms). FIG. 9 illustrates sample electrical components for elements of the wireless transmission system, and subcomponents thereof, in a simplified form. Note that FIG. 9 may represent one branch or sub-section of a schematic for the wireless transmission system 20 and/or components of the wireless transmission system 20 may be omitted from the schematic illustrated in FIG. 9 for clarity.

Figure 8:
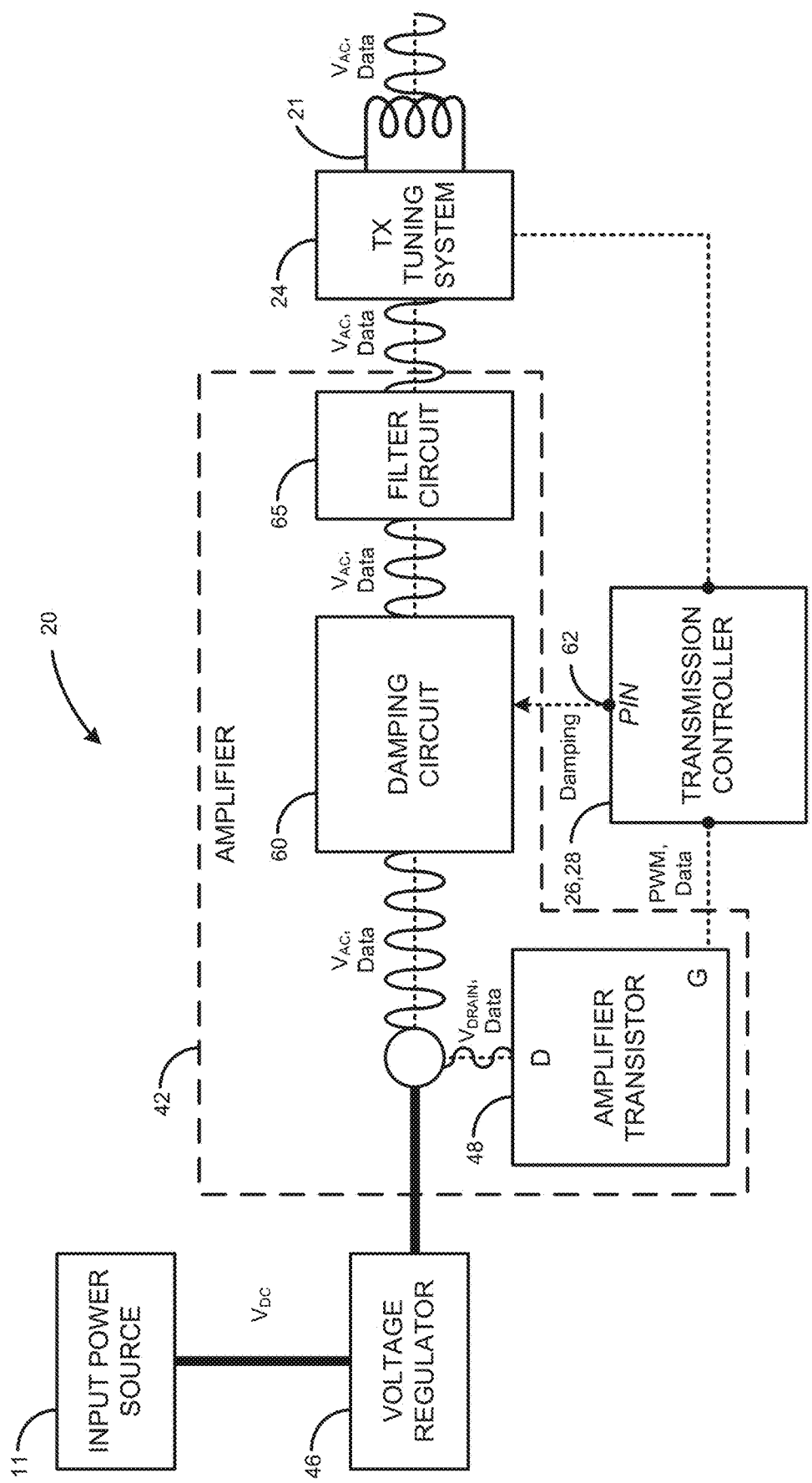
FIG. 8 is a block diagram of elements of the wireless transmission system of FIGS. 1-7, further illustrating components of an amplifier of the power conditioning system of FIG. 7 and signal characteristics for wireless power transmission, in accordance with FIGS. 1-7 and the present disclosure.

As illustrated in FIG. 8 and discussed above, the input power source 11 provides an input direct current voltage ($V_{DC}$), which may have its voltage level altered by the voltage regulator 46, prior to conditioning at the amplifier 42. In some examples, as illustrated in FIG. 9, the amplifier 42 may include a choke inductor $L_{CHOKE}$, which may be utilized to block radio frequency interference in $V_{DC}$, while allowing the DC power signal of $V_{DC}$ to continue towards an amplifier transistor 48 of the amplifier 42. $V_{CHOKE}$ may be configured as any suitable choke inductor known in the art.

The amplifier 48 is configured to alter and/or invert $V_{DC}$ to generate an AC wireless signal $V_{AC}$, which, as discussed in more detail below, may be configured to carry one or both of an inbound and outbound data signal (denoted as "Data" in FIG. 6). The amplifier transistor 48 may be any switching transistor known in the art that is capable of inverting, converting, and/or conditioning a DC power signal into an AC power signal, such as, but not limited to, a field-effect transistor (FET), gallium nitride (GaN) FETS, bipolar junction transistor (BJT), and/or wide-bandgap (WBG) semiconductor transistor, among other known switching transistors. The amplifier transistor 48 is configured to receive a driving signal (denoted as "PWM" in FIG. 6) from at a gate of the amplifier transistor 48 (denoted as "G" in FIG. 8) and invert the DC signal $V_{DC}$ to generate the AC wireless signal at an operating frequency and/or an operating frequency band for the wireless power transmission system 20. The driving signal may be a PWM signal configured for such inversion at the operating frequency and/or operating frequency band for the wireless power transmission system 20.

The driving signal is generated and output by the transmission control system 26 and/or the transmission controller 28 therein, as discussed and disclosed above. The transmission controller 26, 28 is configured to provide the driving signal and configured to perform one or more of encoding wireless data signals (denoted as "Data" in FIG. 6), decoding the wireless data signals (denoted as "Data" in FIG. 6) and any combinations thereof. In some examples, the electrical data signals may be in band signals of the AC wireless power signal. In some such examples, such in-band signals may be on-off-keying (OOK) signals in-band of the AC wireless power signals. For example, Type-A communications, as described in the NFC Standards, are a form of OOK, wherein the data signal is on-off-keyed in a carrier AC wireless power signal operating at an operating frequency in a range of about 13.553 MHz to about 13.567 MHz.

However, when the power, current, impedance, phase, and/or voltage levels of an AC power signal are changed beyond the levels used in current and/or legacy hardware for high frequency wireless power transfer (over about 500 mW transmitted), such legacy hardware may not be able to properly encode and/or decode in-band data signals with the required fidelity for communications functions. Such higher power in an AC output power signal may cause signal degradation due to increasing rise times for an OOK rise, increasing fall time for an OOK fall, overshooting the required voltage in an OOK rise, and/or undershooting the voltage in an OOK fall, among other potential degradations to the signal due to legacy hardware being ill equipped for higher power, high frequency wireless power transfer. Thus, there is a need for the amplifier 42 to be designed in a way that limits and/or substantially removes rise and fall times, overshoots, undershoots, and/or other signal deficiencies from an in-band data signal during wireless power transfer. This ability to limit and/or substantially remove such deficiencies allows for the systems of the instant application to provide higher power wireless power transfer in high frequency wireless power transmission systems.

Figure 10:
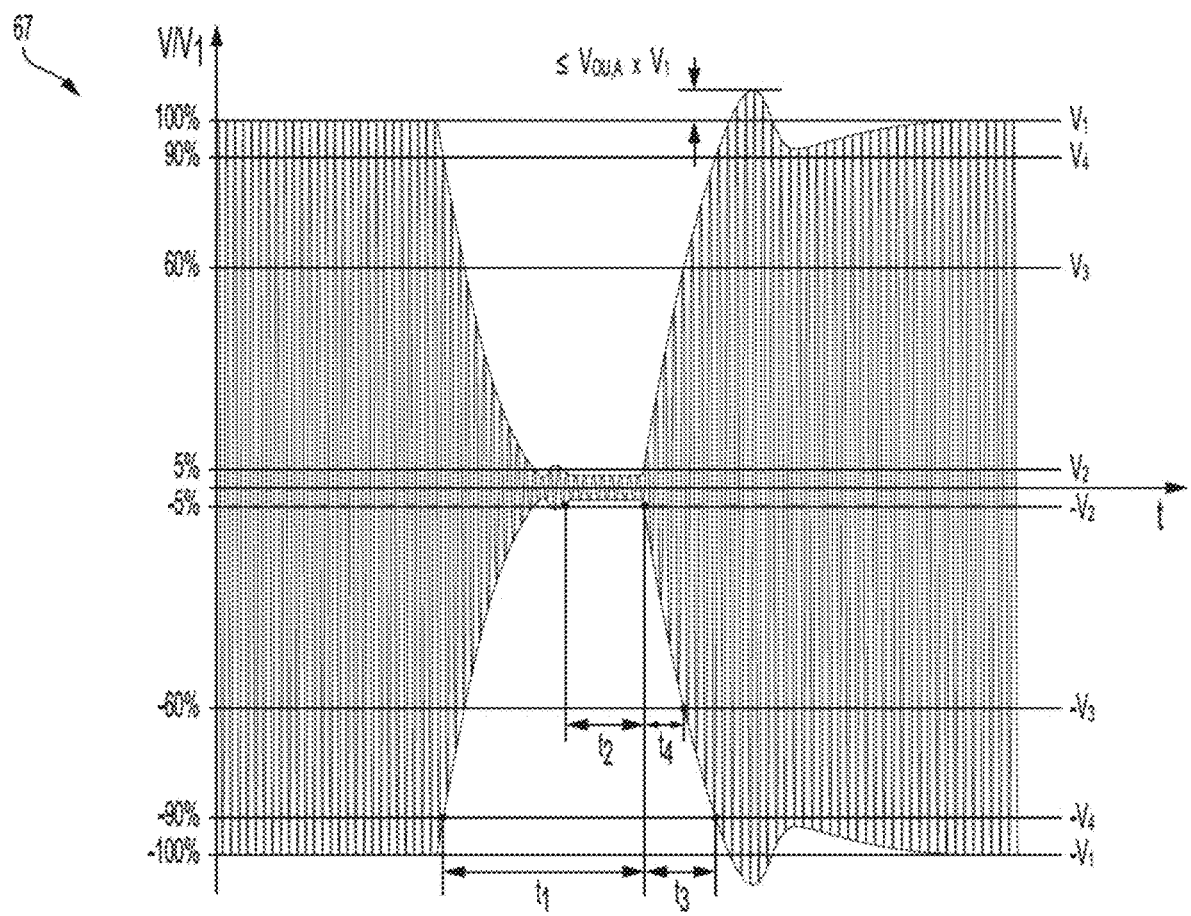
FIG. 10 is an exemplary plot illustrating rise and fall of "on" and "off" conditions when a signal has in-band communications via on-off keying.

For further exemplary illustration, FIG. 10 illustrates a plot for a fall and rise of an OOK in-band signal. The fall time ($t_1$) is shown as the time between when the signal is at 90% voltage ($V_4$) of the intended full voltage ($V_1$) and falls to about 5% voltage ($V_2$) of $V_1$. The rise time ($t_3$) is shown as the time between when the signal ends being at $V_2$ and rises to about $V_4$. Such rise and fall times may be read by a receiving antenna of the signal, and an applicable data communications protocol may include limits on rise and fall times, such that data is non-compliant and/or illegible by a receiver if rise and/or fall times exceed certain bounds.

Returning now to FIGS. 8 and 9, to achieve limitation and/or substantial removal of the mentioned deficiencies, the amplifier 42 includes a damping circuit 60. The damping circuit 60 is configured for damping the AC wireless signal during transmission of the AC wireless signal and associated data signals. The damping circuit 60 may be configured to reduce rise and fall times during OOK signal transmission, such that the rate of the data signals may not only be compliant and/or legible, but may also achieve faster data rates and/or enhanced data ranges, when compared to legacy systems. For damping the AC wireless power signal, the damping circuit includes, at least, a damping transistor 63, which is configured for receiving a damping signal ($V_{damp}$) from the transmission controller 62. The damping signal is configured for switching the damping transistor (on/off) to control damping of the AC wireless signal during the transmission and/or receipt of wireless data signals. Such transmission of the AC wireless signals may be performed by the transmission controller 28 and/or such transmission may be via transmission from the wireless receiver system 30, within the coupled magnetic field between the antennas 21, 31.

In examples wherein the data signals are conveyed via OOK, the damping signal may be substantially opposite and/or an inverse to the state of the data signals. This means that if the OOK data signals are in an "on" state, the damping signals instruct the damping transistor to turn "off" and thus the signal is not dissipated via the damping circuit 60 because the damping circuit is not set to ground and, thus, a short from the amplifier circuit and the current substantially bypasses the damping circuit 60. If the OOK data signals are in an "off" state, then the damping signals may be "on" and, thus, the damping transistor 63 is set to an "on" state and the current flowing of $V_{AC}$ is damped by the damping circuit. Thus, when "on," the damping circuit 60 may be configured to dissipate just enough power, current, and/or voltage, such that efficiency in the system is not substantially affected and such dissipation decreases rise and/or fall times in the OOK signal. Further, because the damping signal may instruct the damping transistor 63 to turn "off" when the OOK signal is "on," then it will not unnecessarily damp the signal, thus mitigating any efficiency losses from $V_{AC}$, when damping is not needed. While depicted as utilizing OOK coding, other forms of in band coding may be utilized for coding the data signals, such as, but not limited to, amplitude shift keying (ASK).

As illustrated in FIG. 9, the branch of the amplifier 42 which may include the damping circuit 60, is positioned at the output drain of the amplifier transistor 48. While it is not necessary that the damping circuit 60 be positioned here, in some examples, this may aid in properly damping the output AC wireless signal, as it will be able to damp at the node closest to the amplifier transistor 48 output drain, which is the first node in the circuit wherein energy dissipation is desired. In such examples, the damping circuit is in electrical parallel connection with a drain of the amplifier transistor 48. However, it is certainly possible that the damping circuit be connected proximate to the antenna 21, proximate to the transmission tuning system 24, and/or proximate to a filter circuit 24.

While the damping circuit 60 is capable of functioning to properly damp the AC wireless signal for proper communications at higher power high frequency wireless power transmission, in some examples, the damping circuit may include additional components. For instance, as illustrated, the damping circuit 60 may include one or more of a damping diode $D_{DAMP}$, a damping resistor $R_{DAMP}$, a damping capacitor $C_{DAMP}$, and/or any combinations thereof. $R_{DAMP}$ may be in electrical series with the damping transistor 63 and the value of $R_{DAMP}$ (ohms) may be configured such that it dissipates at least some power from the power signal, which may serve to accelerate rise and fall times in an amplitude shift keying signal, an OOK signal, and/or combinations thereof. In some examples, the value of $R_{DAMP}$ is selected, configured, and/or designed such that $R_{DAMP}$ dissipates the minimum amount of power to achieve the fastest rise and/or fall times in an in-band signal allowable and/or satisfy standards limitations for minimum rise and/or fall times; thereby achieving data fidelity at maximum efficiency (less power lost to $R_{DAMP}$) as well as maintaining data fidelity when the system is unloaded and/or under lightest load conditions.

$C_{DAMP}$ may also be in series connection with one or both of the damping transistor 63 and $R_{DAMP}$. $C_{DAMP}$ may be configured to smooth out transition points in an in-band signal and limit overshoot and/or undershoot conditions in such a signal. Further, in some examples, $C_{DAMP}$ may be configured for ensuring the damping performed is 180 degrees out of phase with the AC wireless power signal, when the transistor is activated via the damping signal.

$D_{DAMP}$ may further be included in series with one or more of the damping transistor 63, $R_{DAMP}$, $C_{DAMP}$, and/or any combinations thereof. $D_{DAMP}$ is positioned, as shown, such that a current cannot flow out of the damping circuit 60, when the damping transistor 63 is in an off state. The inclusion of $D_{DAMP}$ may prevent power efficiency loss in the AC power signal when the damping circuit is not active or "on." Indeed, while the damping transistor 63 is designed such that, in an ideal scenario, it serves to effectively short the damping circuit when in an "off" state, in practical terms, some current may still reach the damping circuit and/or some current may possibly flow in the opposite direction out of the damping circuit 60. Thus, inclusion of $D_{DAMP}$ may prevent such scenarios and only allow current, power, and/or voltage to be dissipated towards the damping transistor 63. This configuration, including $D_{DAMP}$, may be desirable when the damping circuit 60 is connected at the drain node of the amplifier transistor 48, as the signal may be a half-wave sine wave voltage and, thus, the voltage of $V_{AC}$ is always positive.

Beyond the damping circuit 60, the amplifier 42, in some examples, may include a shunt capacitor $C_{SHUNT}$. $C_{SHUNT}$ may be configured to shunt the AC power signal to ground and charge voltage of the AC power signal. Thus, $C_{SHUNT}$ may be configured to maintain an efficient and stable waveform for the AC power signal, such that a duty cycle of about 50% is maintained and/or such that the shape of the AC power signal is substantially sinusoidal at positive voltages.

In some examples, the amplifier 42 may include a filter circuit 65. The filter circuit 65 may be designed to mitigate and/or filter out electromagnetic interference (EMI) within the wireless transmission system 20. Design of the filter circuit 65 may be performed in view of impedance transfer and/or effects on the impedance transfer of the wireless power transmission 20 due to alterations in tuning made by the transmission tuning system 24. To that end, the filter circuit 65 may be or include one or more of a low pass filter, a high pass filter, and/or a band pass filter, among other filter circuits that are configured for, at least, mitigating EMI in a wireless power transmission system.

As illustrated, the filter circuit 65 may include a filter inductor $L_o$ and a filter capacitor $C_o$. The filter circuit 65 may have a complex impedance and, thus, a resistance through the filter circuit 65 may be defined as $R_o$. In some such examples, the filter circuit 65 may be designed and/or configured for optimization based on, at least, a filter quality factor $\gamma_{FILTER}$, defined as:

$$\gamma_{FILTER} = \frac{1}{R_o}\sqrt{\frac{L_o}{C_o}}.$$

In a filter circuit 65 wherein it includes or is embodied by a low pass filter, the cut-off frequency ($\omega_o$) of the low pass filter is defined as:

$$\omega_o = \frac{1}{\sqrt{L_o C_o}}.$$

In some wireless power transmission systems 20, it is desired that the cutoff frequency be about 1.03-1.4 times greater than the operating frequency of the antenna. Experimental results have determined that, in general, a larger $\gamma_{FILTER}$ may be preferred, because the larger $\gamma_{FILTER}$ can improve voltage gain and improve system voltage ripple and timing. Thus, the above values for $L_o$ and $C_o$ may be set such that $\gamma_{FILTER}$ can be optimized to its highest, ideal level (e.g., when the system 10 impedance is conjugately matched for maximum power transfer), given cutoff frequency restraints and available components for the values of $L_o$ and $C_o$.

As illustrated in FIG. 9, the conditioned signal(s) from the amplifier 42 is then received by the transmission tuning system 24, prior to transmission by the antenna 21. The transmission tuning system 24 may include tuning and/or impedance matching, filters (e.g. a low pass filter, a high pass filter, a "pi" or "Π" filter, a "T" filter, an "L" filter, a "LL" filter, and/or an L-C trap filter, among other filters), network matching, sensing, and/or conditioning elements configured to optimize wireless transfer of signals from the wireless transmission system 20 to the wireless receiver system 30. Further, the transmission tuning system 24 may include an impedance matching circuit, which is designed to match impedance with a corresponding wireless receiver system 30 for given power, current, and/or voltage requirements for wireless transmission of one or more of electrical energy, electrical power, electromagnetic energy, and electronic data. The illustrated transmission tuning system 24 includes, at least, $C_{z1}$, $C_{z2}$. and (operatively associated with the antenna 21) values, all of which may be configured for impedance matching in one or both of the wireless transmission system 20 and the broader system 10. It is noted that $C_{Tx}$ refers to the intrinsic capacitance of the antenna 21.

Figure 11:
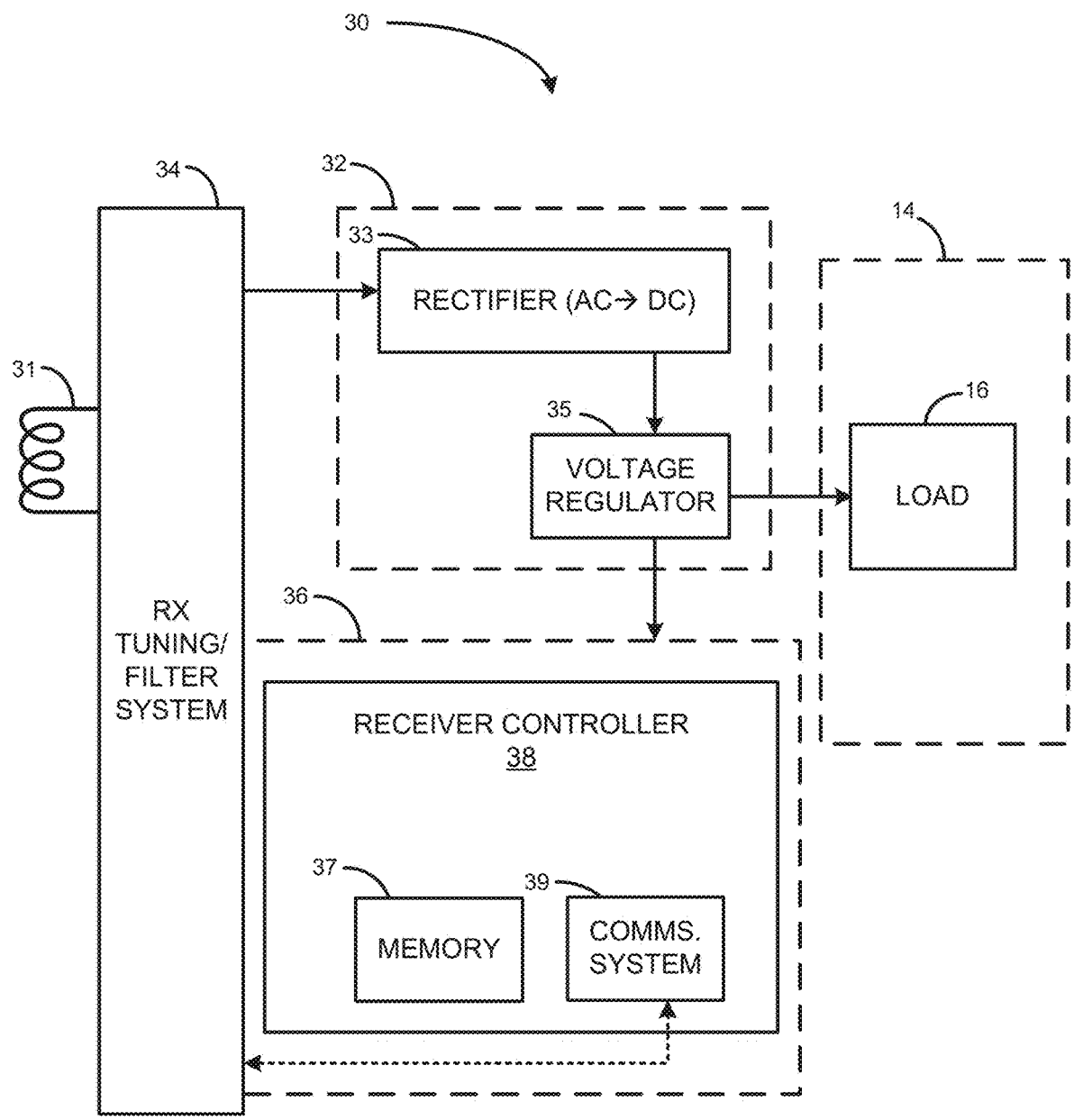
FIG. 11 is a block diagram illustrating components of a receiver control system and a receiver power conditioning system of the wireless receiver system of FIG. 4, in accordance with FIG. 3, FIG. 4, and the present disclosure.

Turning now to FIG. 11 and with continued reference to, at least, FIGS. 3 and 4, the wireless receiver system 30 is illustrated in further detail. The wireless receiver system 30 is configured to receive, at least, electrical energy, electrical power, electromagnetic energy, and/or electrically transmittable data via near field magnetic coupling from the wireless transmission system 20, via the transmission antenna 21. As illustrated in FIG. 11, the wireless receiver system 30 includes, at least, the receiver antenna 31, a receiver tuning and filtering system 34, a power conditioning system 32 and a receiver control system 36. The receiver tuning and filtering system 34 may be configured to substantially match the electrical impedance of the wireless transmission system 20. In some examples, the receiver tuning and filtering system 34 may be configured to dynamically adjust and substantially match the electrical impedance of the receiver antenna 31 to a characteristic impedance of the power generator or the load at a driving frequency of the transmission antenna 20.

As illustrated, the power conditioning system 32 includes a rectifier 33 and a voltage regulator 35. In some examples, the rectifier 33 is in electrical connection with the receiver tuning and filtering system 34. The rectifier 33 is configured to modify the received electrical energy from an alternating current electrical energy signal to a direct current electrical energy signal. In some examples, the rectifier 33 is comprised of at least one diode. Some non-limiting example configurations for the rectifier 33 include, but are not limited to including, a full wave rectifier, including a center tapped full wave rectifier and a full wave rectifier with filter, a half wave rectifier, including a half wave rectifier with filter, a bridge rectifier, including a bridge rectifier with filter, a split supply rectifier, a single phase rectifier, a three phase rectifier, a voltage doubler, a synchronous voltage rectifier, a controlled rectifier, an uncontrolled rectifier, and a half controlled rectifier. As electronic devices may be sensitive to voltage, additional protection of the electronic device may be provided by clipper circuits or devices. In this respect, the rectifier 33 may further include a clipper circuit or a clipper device, which is a circuit or device that removes either the positive half (top half), the negative half (bottom half), or both the positive and the negative halves of an input AC signal. In other words, a clipper is a circuit or device that limits the positive amplitude, the negative amplitude, or both the positive and the negative amplitudes of the input AC signal.

Some non-limiting examples of a voltage regulator 35 include, but are not limited to, including a series linear voltage regulator, a buck convertor, a low dropout (LDO) regulator, a shunt linear voltage regulator, a step up switching voltage regulator, a step down switching voltage regulator, an inverter voltage regulator, a Zener controlled transistor series voltage regulator, a charge pump regulator, and an emitter follower voltage regulator. The voltage regulator 35 may further include a voltage multiplier, which is as an electronic circuit or device that delivers an output voltage having an amplitude (peak value) that is two, three, or more times greater than the amplitude (peak value) of the input voltage. The voltage regulator 35 is in electrical connection with the rectifier 33 and configured to adjust the amplitude of the electrical voltage of the wirelessly received electrical energy signal, after conversion to AC by the rectifier 33. In some examples, the voltage regulator 35 may an LDO linear voltage regulator; however, other voltage regulation circuits and/or systems are contemplated. As illustrated, the direct current electrical energy signal output by the voltage regulator 35 is received at the load 16 of the electronic device 14. In some examples, a portion of the direct current electrical power signal may be utilized to power the receiver control system 36 and any components thereof; however, it is certainly possible that the receiver control system 36, and any components thereof, may be powered and/or receive signals from the load 16 (e.g., when the load 16 is a battery and/or other power source) and/or other components of the electronic device 14.

The receiver control system 36 may include, but is not limited to including, a receiver controller 38, a communications system 39 and a memory 37. The receiver controller 38 may be any electronic controller or computing system that includes, at least, a processor which performs operations, executes control algorithms, stores data, retrieves data, gathers data, controls and/or provides communication with other components and/or subsystems associated with the wireless receiver system 30. The receiver controller 38 may be a single controller or may include more than one controller disposed to control various functions and/or features of the wireless receiver system 30. Functionality of the receiver controller 38 may be implemented in hardware and/or software and may rely on one or more data maps relating to the operation of the wireless receiver system 30. To that end, the receiver controller 38 may be operatively associated with the memory 37. The memory may include one or both of internal memory, external memory, and/or remote memory (e.g., a database and/or server operatively connected to the receiver controller 38 via a network, such as, but not limited to, the Internet). The internal memory and/or external memory may include, but are not limited to including, one or more of a read only memory (ROM), including programmable read-only memory (PROM), erasable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory computer readable memory media.

Further, while particular elements of the receiver control system 36 are illustrated as subcomponents and/or circuits (e.g., the memory 37, the communications system 39, among other contemplated elements) of the receiver control system 36, such components may be external of the receiver controller 38. In some examples, the receiver controller 38 may be and/or include one or more integrated circuits configured to include functional elements of one or both of the receiver controller 38 and the wireless receiver system 30, generally. As used herein, the term "integrated circuits" generally refers to a circuit in which all or some of the circuit elements are inseparably associated and electrically interconnected so that it is considered to be indivisible for the purposes of construction and commerce. Such integrated circuits may include, but are not limited to including, thin-film transistors, thick-film technologies, and/or hybrid integrated circuits.

In some examples, the receiver controller 38 may be a dedicated circuit configured to send and receive data at a given operating frequency. For example, the receiver controller 38 may be a tagging or identifier integrated circuit, such as, but not limited to, an NFC tag and/or labelling integrated circuit. Examples of such NFC tags and/or labelling integrated circuits include the NTAG® family of integrated circuits manufactured by NXP Semiconductors N.V. However, the communications system 39 is certainly not limited to these example components and, in some examples, the communications system 39 may be implemented with another integrated circuit (e.g., integrated with the receiver controller 38), and/or may be another transceiver of or operatively associated with one or both of the electronic device 14 and the wireless receiver systems 30, among other contemplated communication systems and/or apparatus. Further, in some examples, functions of the communications system 39 may be integrated with the receiver controller 38, such that the controller modifies the inductive field between the antennas 21, 31 to communicate in the frequency band of wireless power transfer operating frequency.

Figure 12:
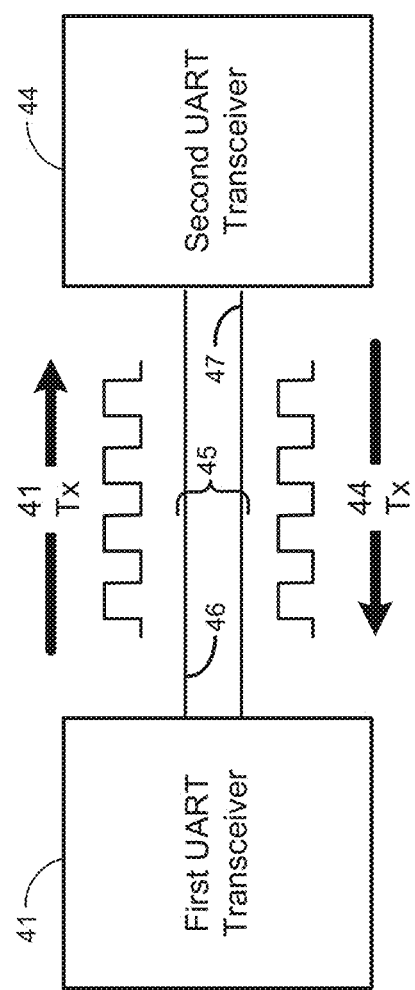
FIG. 12 is schematic functional plot of UART serial wired components overlaid with example communications, by way of background.

Turning to FIG. 12, this figure is a schematic functional plot of physically, electrically connected (e.g., wire connected) two-way data communications components, otherwise known as transceivers, which are overlaid with example communications. The communications between such two-way wired data communication components may include, but are not limited to including, data communications and/or connections compliant with a serial and/or universal asynchronous receiver-transmitter (UART) based protocol; however, such two-way wired data communications, and/or any simulations thereof, are certainly not limited to UART based protocol data communications and/or connections.

UART provides a wired serial connection that utilizes serial data communications over a wired (human-tangible, physical electrical) connection between UART transceivers, which may take the form of a two-wire connection. UART transceivers transmit data over the wired connection asynchronously, i.e., with no synchronizing clock. A transmitting UART transceiver (e.g., a first UART transceiver 41, as illustrated) packetizes the data to be sent and adds start and stop bits to the data packet, defining, respectively, the beginning and end of the data packet for the receiving UART transceiver (e.g., a second UART transceiver 44). In turn, upon detecting a start bit, the receiving UART transceiver 44 reads the incoming bits at a common frequency, such as an agreed baud rate. This agreed baud rate is what allows UART communications to succeed in the absence of a synchronizing clock signal.

In the illustrated example, the first UART transceiver 41 may transmit a multi-bit data sequence (such as is shown in the data diagrams of FIG. 11) to the second UART transceiver 44, via UART communication, and likewise, the second UART transceiver 44 may transmit a multi-bit data element to the first UART transceiver 41. For instance, a UART-encoded signal representing a multi-bit data element may be transmitted over a two-wire connection 45 between the first UART transceiver 41 and the second UART transceiver 44. As shown in the illustrated example, a first wire 46 of the two-wire connection 45 may be used for communication in one direction while a second wire 47 of the two-wire connection 45 may be used for communication in the other direction.

Figure 13:
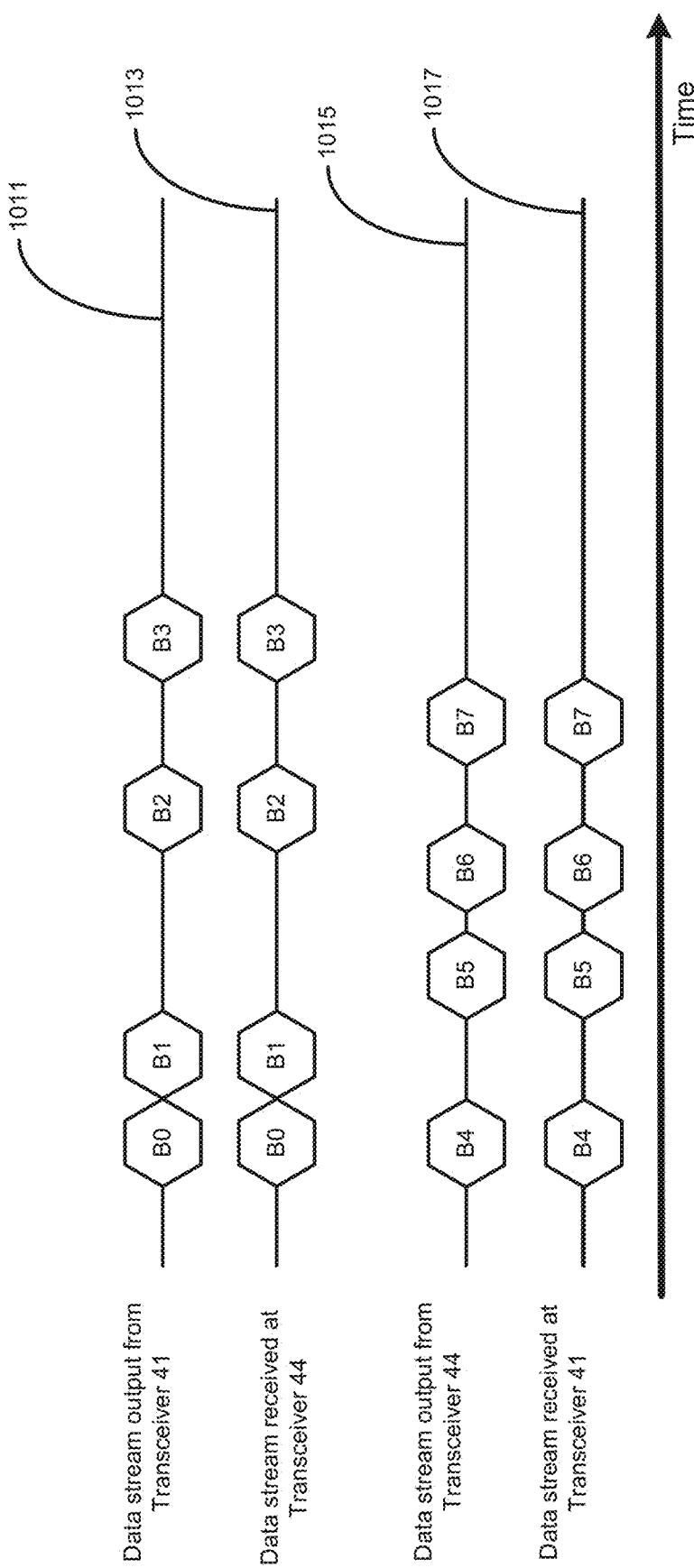
FIG. 13 is timing diagram showing packet communications over UART serial wired communications, by way of background.

FIG. 13 is a timing diagram showing packetized communications of a multi-bit data element over a standard wired UART connection, such as that shown in FIG. 10. In the illustrated example, the first multi-bit data element, for transmission from the first UART transceiver 41 to the second UART transceiver 44, is a first 4-bit number $B_0B_1B_2B_3$. As can be seen, this number is serialized as a single bit stream for transmission and subsequent receipt over the UART connection. The top data stream 1011 shows an example of the serial data stream as output from the first UART transceiver 41, while the second data stream 1013 shows the data stream 1011 as it is then received over the UART connection at transceiver 44. Similarly, the data streams 1015 and 1017 represent the transmission by the second UART transceiver 44 of a second 4-bit number $B_4B_5B_6B_7$ and receipt by the first UART transceiver 41 of that data.

While wired, two-wire, simultaneous two-way communications are a regular means of communication between two devices, it is desired to eliminate the need for such wired connections, while simulating and/or substantially replicating the data transmissions that are achieved today via wired two-way communications, such as, but not limited to serial wired communications that are compliant with UART and/or other data transmission protocols. To that end, FIGS. 12-15 illustrate systems, methods, and/or protocol components utilized to carry out such serial two-way communications wirelessly via the wireless power transfer system 10.

Figure 14:
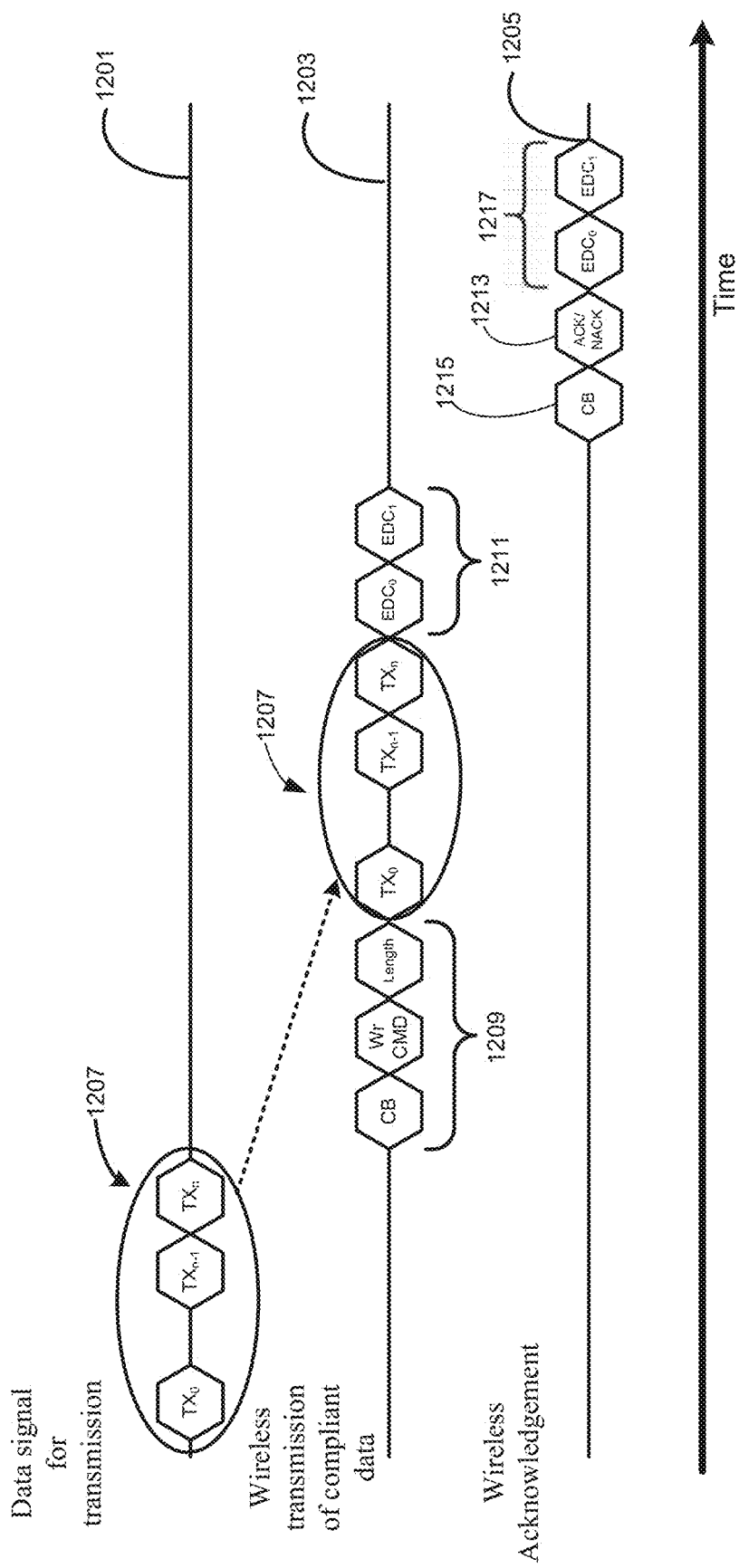
FIG. 14 is a timing diagram showing encapsulation of wirelessly transmitted data, in accordance with the present disclosure.

Turning to FIG. 14, this figure shows a set of a vertically-registered signal timing diagrams associated with a wireless exchange of data and associated communications over a wireless connection, as a function of time, in accordance with the present disclosure. For example, the wireless connection herein may be the magnetic coupling of the transmitter antenna 21 and the receiver antenna 31 of, respectively, the wireless transmission system 20 and the wireless receiver system 30, discussed above. In this situation, the wireless exchange of data occurs between the wireless transmission system 20 and the wireless receiver system 30. It should be noted that data transferred over the wireless connection may be generated, encoded, and/or otherwise provided by one or both of the transmission controller 28 and the receiver controller 38. Such data may be any data, such as, but not limited to, data associated with the wireless transmission of electrical energy, data associated with a host device associated with one of the wireless transmission system 20 or the wireless receiver system 30, or combinations thereof. While illustrated in FIG. 14, along with the proceeding drawings, as a transfer of data from the wireless transmission system 20 to the wireless receiver system 30, as mentioned, the simulated serial communications between the systems 20, 30 may be bidirectional (i.e., two-way), such that both systems 20, 30 are capable of transmission, receipt, encoding, decoding, other bi-directional communications functions, or combinations thereof.

The originating data signal 1201 is an example UART input to the wireless transmission system 20, e.g., as a UART data input to the wireless transmission system 20 and/or the transmission controller 28 and/or as a UART data input to the wireless receiver system 30 and/or the receiver controller 38. While the figure shows the data originating at and transmitted by the wireless transmission system 20/transmission controller 28, the transmission controller 28 and/or the receiver controller 38 may communicate data within the power signal by modulating the inductive field between the antennas 21, 31 to communicate in the frequency band of the wireless power transfer operating frequency.

The wireless serial data signal 1203 in FIG. 14 shows a resultant data stream conveying the data of the originating data signal 1201 as an encapsulated transmission. The acknowledgment signal 1205, shown in FIG. 14, represents a transmission-encapsulated acknowledgment (ACK) or non-acknowledgement (NACK) signal, communicated over the near field magnetic connection, by the receiver controller 38, upon acknowledgment or non-acknowledgement of receipt of the wireless serial data signal 1203, by the receiver controller 38.

Turning to the specific contents of each signal in FIG. 14, the originating data signal 1201 includes an n-byte data element 1207 comprised of bytes $T_{x0} \ldots T_{xn-1}, T_{xn}$. In the wireless serial data signal 1203, the data stream may include a command header 1209 and a checksum 1211, in accordance with the particular transmission protocol in use in the example. "n" indicates any number of bytes for data elements, defined herein. For example, the command header 1209 may include a Control Byte ("CB"), Write command ("Wr CMD") and Length code ("Length"). The Control Byte contains, for example, information required to control data transmission of blocks. The Write command may include information specifying that encapsulated data is to be written at the receiving end. The Length code may include information indicating the length of the n-byte data element 1207. The checksum 1211 may be a datum used for the purpose of detecting errors and may be determined by or generated from a checksum algorithm. The ACK signal 1213 from the receiver is similarly encapsulated between a CB 1215 and a checksum 1217.

Figure 15:
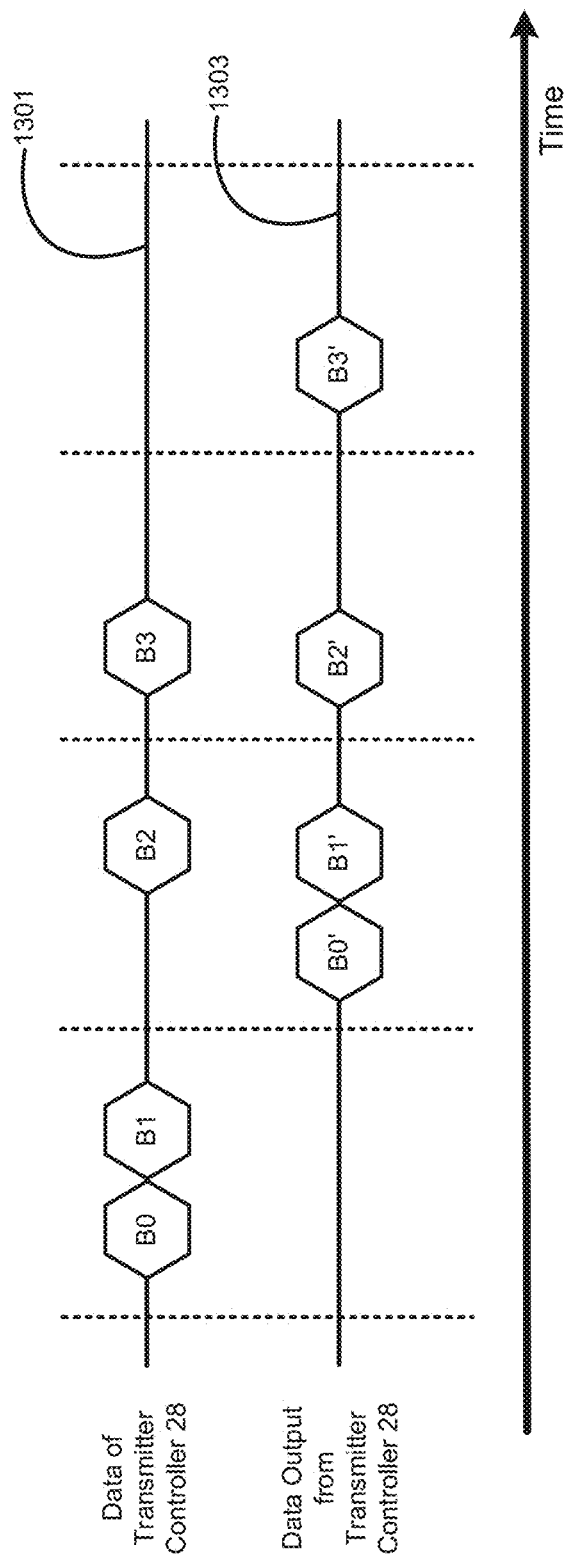
FIG. 15 is a timing diagram showing receiver and transmitter timing functions, in accordance with the present disclosure.

FIG. 15 is a timing diagram showing receiver and transmitter timing functions in accordance with the present disclosure. For example, the receiver timing functions may be the timing of data transmission/receipt at the receiver controller 38 and the transmitter timing functions may be the timing of data transmission/receipt at the transmission controller 28. In this example, the receiver and transmitter timing utilizes a slotted protocol, wherein certain slots of time are available for data transmission, as in-band data communications of the wireless power signal between the transmission antenna 21 and the receiver antenna 31. Utilizing such timing and/or protocol may provide for virtually simultaneous data transfer between the transmission controller 28 and the receiver controller 38, as both the transmission controller 28 and the receiver controller 38 may be capable of altering an amplitude (voltage/current) of the magnetic field between the antennas 21, 31. "Virtually simultaneous data transfer" refers to data transfer which may not be actually simultaneous, but performed at a speed and with such regular switching of active transmitter of data (e.g., the wireless transmission system 20 or the wireless receiver system 30), such that the communications provide a user experience comparable to actual simultaneous data transfer.

In the illustrated embodiment, the first line 1301 shows an incoming stream of bytes $B_0, B_1, B_2, B_3$, to the transmission controller 28. If the transmission controller 28 is configured to transmit data in time slots, then the incoming bytes are slightly delayed and placed into sequential slots as they become available. In other words, data that arrives during a certain time slot (or has any portion arriving during that time slot) will be placed into a subsequent time slot for transmission. This is shown in the second line 1303, which shows data to be transmitted over the wireless link, e.g., a wireless power and data connection. As can be seen, the analog of each byte is sent in the subsequent slot after the data arrives at the transmission controller 28, from, for example, a data source associated with the wireless transmission system 20.

Figure 16:
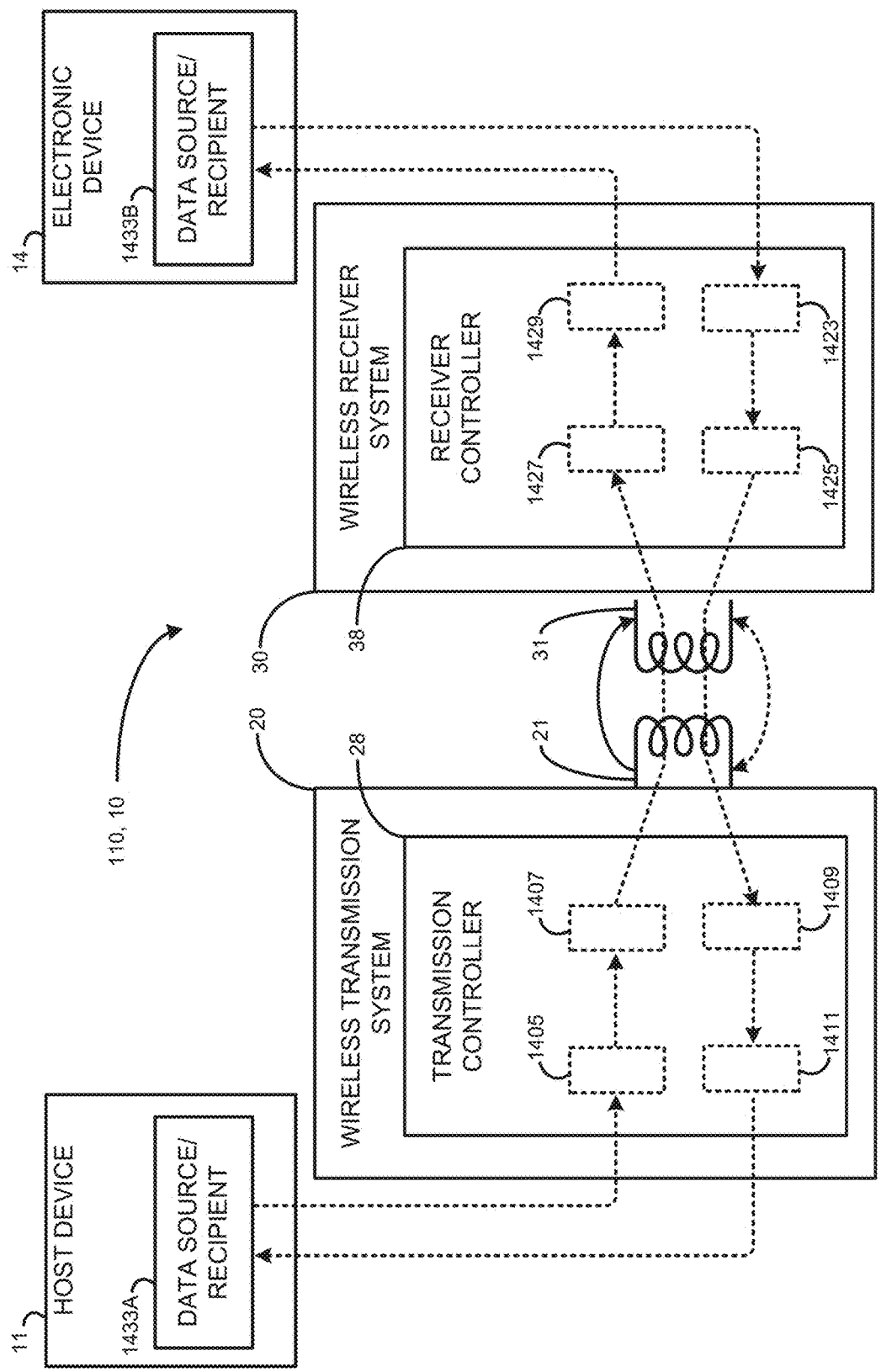
FIG. 16 is a schematic diagram of a system segment for buffering data communication for transmission and receipt via near-field magnetic coupling, in accordance with the present disclosure.

In a buffered system, communications can be held in one or more buffers until the subsequent processing element is ready for communications. To that end, if one side is attempting to pass a large amount of data but the other side has no need to send data, communications can be accelerated since they can be sent "one way" over the virtual "wire" created by the inductive connection. Therefore, while such electromagnetic communications are not literally "two-way" communications utilizing two wires, virtual two-way UART communications are executable over the single inductive FIG. 16 is a schematic diagram 110 of a one or more components of the wireless power transfer system 10, including the transmission controller 28 and the receiver controller 38 of, respectively, the wireless transmission system 20 and the wireless receiver system 30. The diagram 110 illustrates a configuration of the system 10 capable of buffering data in order to facilitate virtual two-way communications. The transmission controller 28 may receive data from a first data source/recipient 1433 A associated with the wireless transmission system 20; however, it is certainly contemplated that the source of the data for the transmission controller 28 is the transmission controller 28 and/or any data collecting/providing elements of the wireless transmission system 20, itself. The data source/recipient 1433A may be operatively associated with a host device 11 that hosts or otherwise utilizes the wireless transmission system 20. Data provided by the data source/recipient 1433A may be processed by the transmission controller 28, transmitted from the transmission antenna 21 to the receiver antenna 31, processed by the receiver controller 38, and, ultimately, received by a second data source/recipient 1433B.

The second data source/recipient 1433B may be associated with the electronic device 14, which hosts or otherwise utilizes the wireless receiver system 30.

As shown, the illustrated example includes a series of buffers 1405, 1407, 1409, 1411, 1423, 1425, 1427, 1429, each associated with one of the transmission controller 28 or the receiver controller 38. The buffers 1405, 1407, 1409, 1411, 1423, 1425, 1427, 1429 may be used to properly order the data for transmission and receipt, especially when the communication between the wireless transmission system 20 and wireless receiver system 30 includes data of a type typically associated with a two-wire, physical, serialized data communications system, such as the UART transceivers of FIG. 10. In an embodiment, the output of the one or more buffers 1405, 1407, 1409, 1411, 1423, 1425, 1427, 1429 in the wireless power transmission system is clocked to trigger buffered data for transmission, meaning that the controller 28, 38 may be configured to output the buffered data at a regular, repeating, clocked timing In the illustrated example, the transmission controller 28 includes two outgoing buffers 1405, 1407 to buffer outgoing communications, as well as two incoming buffers 1409, 1411 to buffer incoming communications. Similarly, the receiver controller 28 includes two incoming buffers 1429, 1427 to buffer incoming communications and two outgoing buffers 1423, 1425 to buffer outgoing communications.

The purpose of these two-buffer sets, in an embodiment, is to manage overflow by mirroring the first buffer in the chain to the second when full, allowing the accumulation of subsequent data in the now-cleared first buffer. Thus, for example, data entering buffer 1405 from data source 1433A is accumulated until buffer 1405 is full or reaches some predetermined level of capacity. At that point, the accumulated data is transferred into buffer 1407 so that buffer 1405 can again accumulate data coming from the data source 1433A. While the two-buffer sets are used in this illustration, by way of example, it will be appreciated that single buffers may be used or, alternatively, three-buffer or larger buffer sets may be used. Similarly, the manner of using the illustrated two-buffer sets is not necessary in every embodiment, and other accumulation schemes may be used instead.

Figure 17:
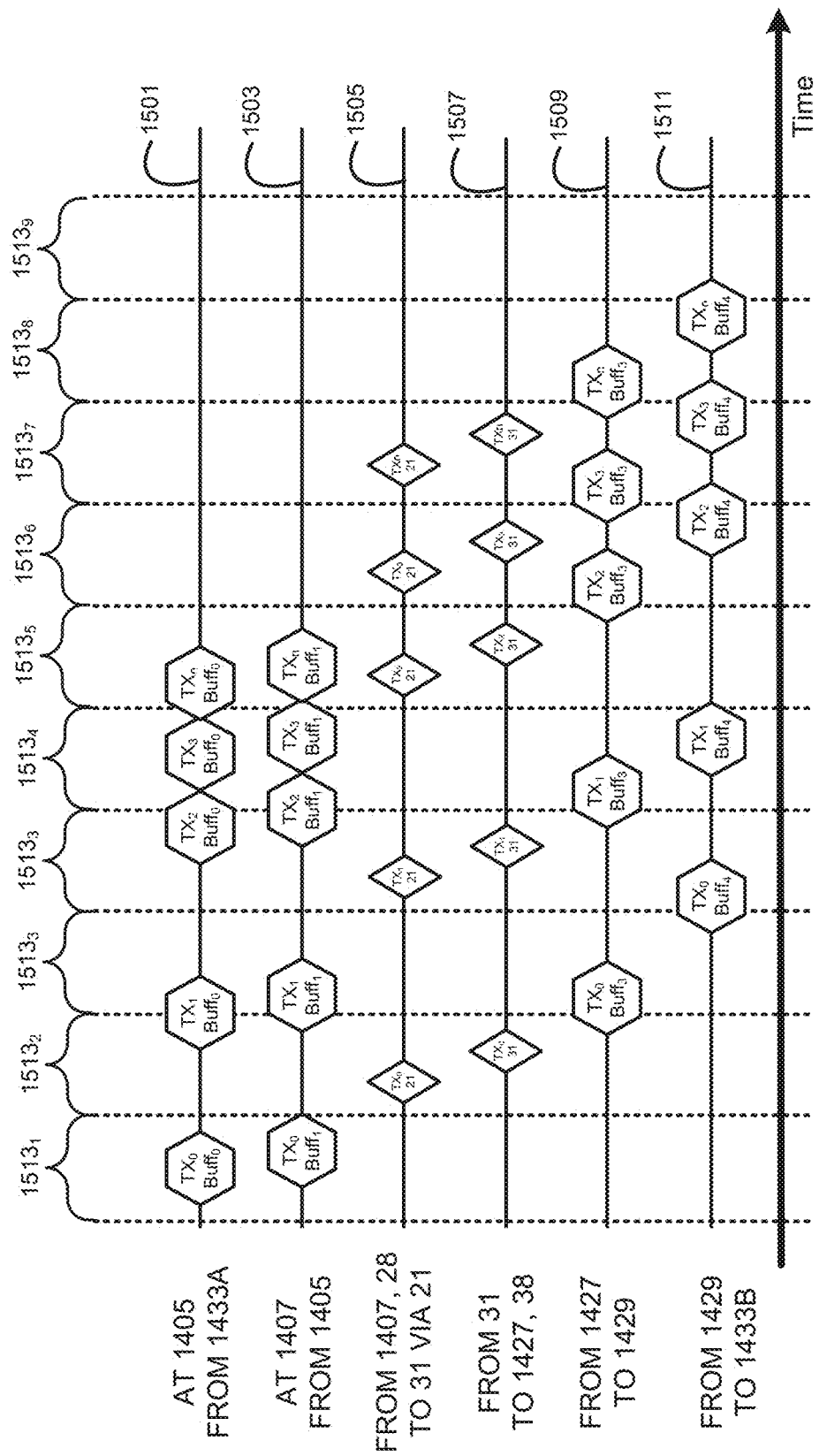
FIG. 17 is a set of vertically-registered timing diagrams reflecting buffered data communications, in accordance with the present disclosure.

FIG. 17 is a timing diagram showing initial data input (line 1501), buffering (lines 1501, 1503), and wireless transmission (lines 1505, 1507), as well as receipt (line 1509), buffering (line 1509, 1511), and data output (line 1511) in the context of a configuration, such as that shown in FIG. 14. The first three lines 1501, 1503, 1505 show a series of data transfers for sending asynchronous incoming data such as UART data across a wireless connection. The last three lines 1507, 1509, 1511 show the receipt and processing of embedded data in a wireless transmission.

As can be seen, the data stream in the first two lines 1501, 1503, represent incoming data received and buffered at the transmission controller 28. The buffered data is then transmitted within the prescribed wireless data slots $1513n$ in line 1505, which may, for example, cover a very small portion of the transmission bandwidth. Note, that the wireless data slots $1513n$ have no bearing on the timing of data receipt/internal transfer within the controllers 28, 38, but may be utilized for timing the modulation of the induced field between the antennas 21, 31 that is utilized for transmission of data.

In the non-limiting example of FIG. 15, line 1501 shows a series of data packets from the transmission system 20 ($TX_0 \ldots TX_n$) sequentially input to a first outgoing buffer 1405 ($Buff_0$). Then, prior to transmission via the transmitter antenna 21, the series of data packets ($TX_0 \ldots TX_n$) are input to the second outgoing buffer 1407 ($Buff_1$), as illustrated in line 1503. Then, the transmission controller 21 sequentially encodes the series of data packets ($TX_0 \ldots TX_n$) into the driving signal for the transmitter antenna 21 (line 1505) which is then received and/or detected in the magnetic field between the antennas antenna 21, 31, at the wireless receiver system 30 (line 1507).

As noted above, the last three lines 1507, 1509, 1511 show the receipt and processing of embedded data in the wireless transmission, and in particular show wireless receipt of the data (1507), buffering of the received data (1509, 1511) and outputting of the buffered data (1511). Again, the output of the one or more buffers in the wireless power transmission system may be clocked to trigger buffered data for transmission.

In the non-limiting example of FIG. 15, line 1507 shows a series of data packets originating from the transmission system 20 ($TX_0 \ldots TX_n$) and received at the receiver antenna 31 sequentially input to a first input buffer 1427 ($Buff_3$) of the receiver controller 38, upon sequential decoding of the series of data packets ($TX_0 \ldots TX_n$) by the receiver controller 38 detection of the magnetic field between antennas 21, 31. Then, prior to output of the data to the data recipient 1433B, the series of data packets ($TX_0 \ldots TX_n$) are input to a second input buffer 1429 ($Buff_4$) from the first input buffer ($Buff_3$), as illustrated in line 1511.

As best illustrated in FIG. 14, by utilizing the buffers and the ability of both the transmission controller 28 and the receiver controller 38 to encode data into the wireless power signal transmitted over the connection between the antennas 21, 31, such combinations of hardware and software may simulate the two-wire connections (FIGS. 10, 11), depicted as dotted, arrowed lines in FIG. 14. Thus, the systems and methods disclosed herein may be implemented to provide a "virtual wired" serial and/or "virtual wired" UART data communications system, method, or protocol, for data transfer between the wireless transmission system 20 and the wireless receiver system 30 and/or between the host devices thereof. "Virtual wired," as defined herein, refers to a wireless data connection, between two devices, that simulates the functions of a wired connection and may be utilized in lieu of said wired connection.

In contrast to the wired serial data transmission systems such as UART, as discussed in reference to FIGS. 12 and 13, the systems and methods disclosed herein eliminate the need for a wired connection between communicating devices, while enabling a data communication interpretable by legacy systems that utilize known data protocols, such as UART. Further, in some examples, such legacy-compatible systems may enable manufacturers to quickly introduce wireless data and/or power connections between devices, without needing to fully reprogram their data protocols and/or without having to hinder interoperability between devices.

Additionally or alternatively, such systems and methods for data communications, when utilized as part of a combined wireless power and wireless data system, may provide for much faster legacy data communications across an inductive wireless power connection, in comparison to legacy systems and methods for in-band communications.

Figure 18:
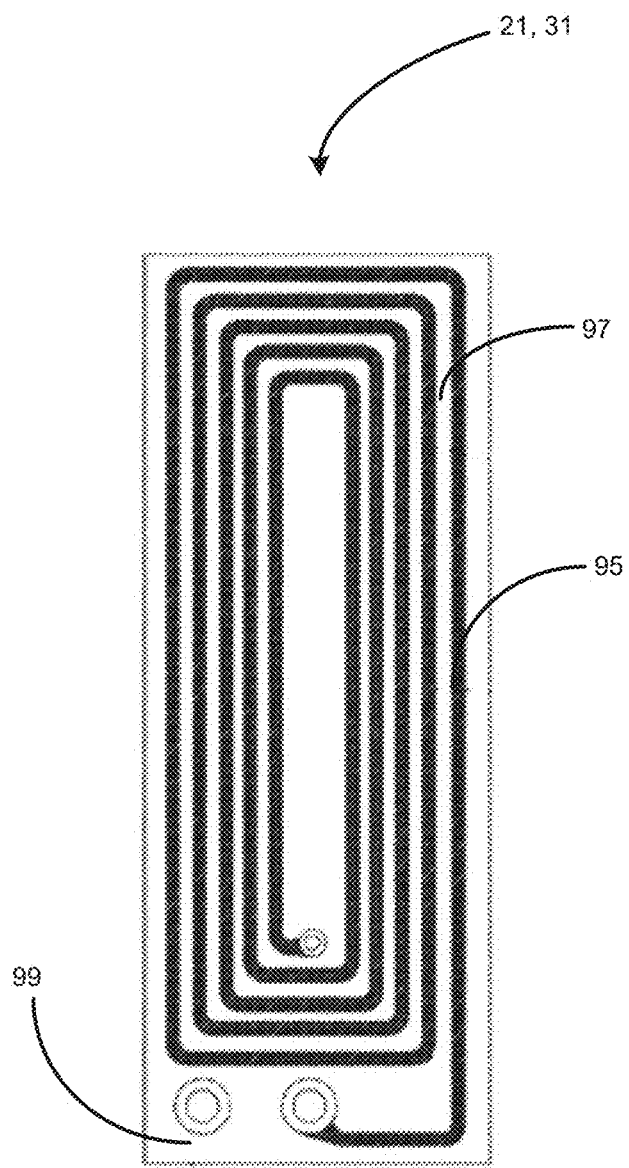
FIG. 18 is a top view of a non-limiting, exemplary antenna, for use as one or both of a transmission antenna and a receiver antenna of the systems, methods, or apparatus disclosed herein, in accordance with the present disclosure.

FIG. 18 illustrates an example, non-limiting embodiment of one or more of the transmission antenna 21 and the receiver antenna 31 that may be used with any of the systems, methods, and/or apparatus disclosed herein. In the illustrated embodiment, the antenna 21, 31, is a flat spiral coil configuration. Non-limiting examples can be found in U.S. Pat. Nos. 9,941,743, 9,960,628, 9,941,743 all to Peralta et al.; 9,948,129, 10,063,100 to Singh et al.; U.S. Pat. No. 9,941,590 to Luzinski; U.S. Pat. No. 9,960,629 to Rajagopalan et al.; and U.S. Patent App. Nos. 2017/0040107, 2017/0040105, 2017/0040688 to Peralta et al.; all of which are assigned to the assignee of the present application and incorporated fully herein by reference.

In addition, the antenna 21, 31 may be constructed having a multi-layer-multi-turn (MLMT) construction in which at least one insulator is positioned between a plurality of conductors. Non-limiting examples of antennas having an MLMT construction that may be incorporated within the wireless transmission system(s) 20 and/or the wireless receiver system(s) 30 may be found in U.S. Pat. Nos. 8,610,530, 8,653,927, 8,680,960, 8,692,641, 8,692,642, 8,698,590, 8,698,591, 8,707,546, 8,710,948, 8,803,649, 8,823,481, 8,823,482, 8,855,786, 8,898,885, 9,208,942, 9,232,893, and 9,300,046 to Singh et al., all of which are assigned to the assignee of the present application are incorporated fully herein. These are merely exemplary antenna examples; however, it is contemplated that the antennas 21, 31 may be any antenna capable of the aforementioned higher power, high frequency wireless power transfer.

Figure 19:
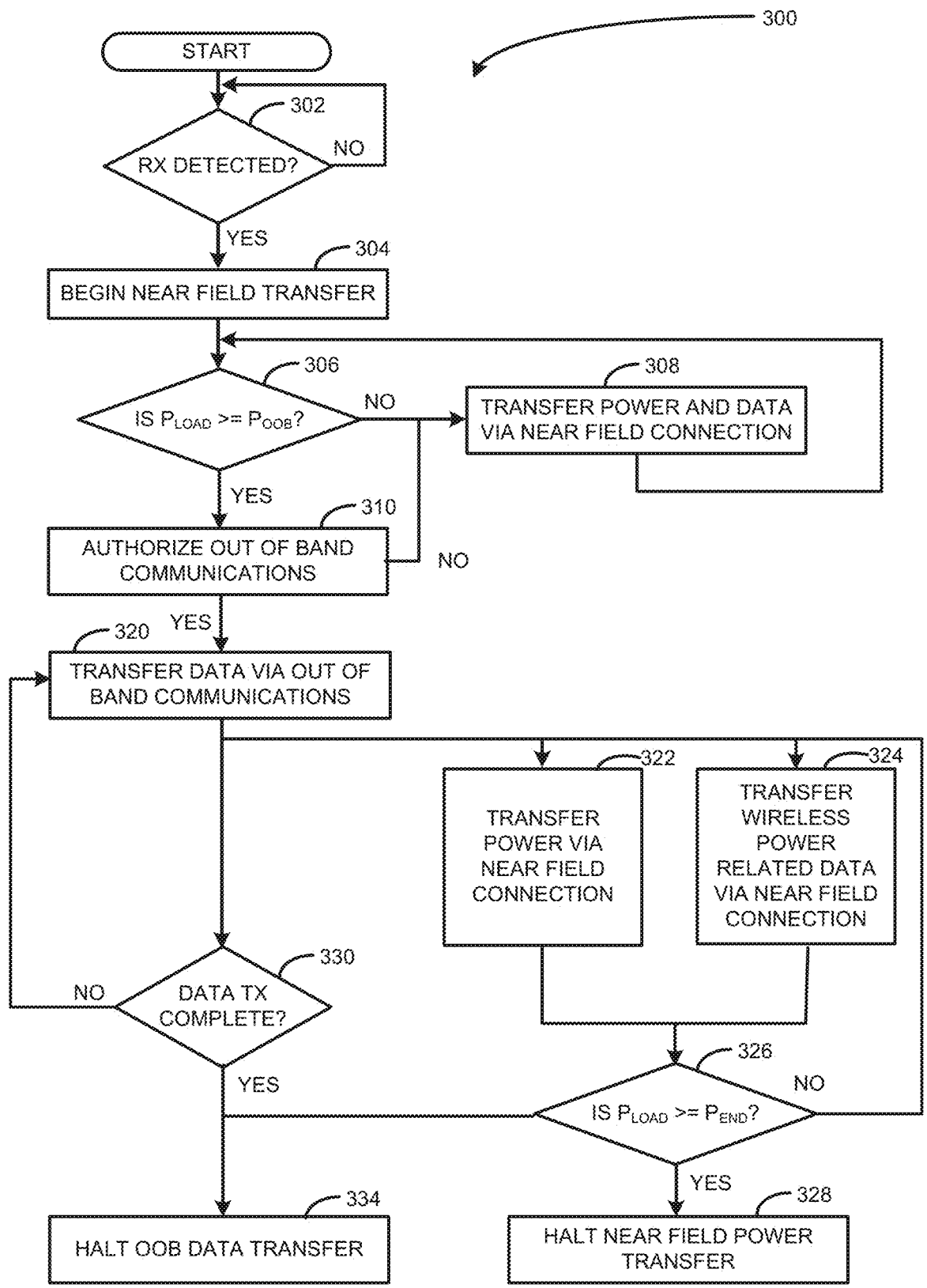
FIG. 19 is a flowchart for an example method for handing off data communications from the wireless power and data transfer system to out of band communications, in accordance with the present disclosure.

Turning now to FIG. 19, a block diagram for an operation method 300 for the wireless power and data transfer between the host device 11 and the electronic device 14 is illustrated. The method 300 may be utilized to hand off wireless data transmission from the inductive connection between the wireless transmission system 20 and the wireless receiver system 30 to the out of band link between the transmission out of band communications system 72 and the receiver out of band communications system 82. "Out of band" as defined herein, refers to communications between the host device 11 and the electronic device 14 that are independent of the inductive link between the wireless transmission system 20 and the wireless receiver system 30. Thus, after handing off of communications, the out of band communications systems 72, 82 takes over communications between the host device 11 and the electronic device 14. As discussed in more detail below, the hand off of communications from the systems 20, 30 to the out of band communications systems 72, 82 may be based on electrical conditions associated with the load 16 of the electronic device 14.

The method begins with object detection at the decision 302, wherein the wireless transmission system 20 determines presence of a wireless receiver system 30 associated with an electronic device 14, within proximity for near field inductive transfer of wireless power and data. If no wireless receiver system 30 is detected, the method 300 continues by having the wireless transmission system 20 continue to search or poll for a wireless receiver system 30. If a wireless receiver system 30 is detected, then the method continues to block 304, wherein the near field inductive transfer of wireless power and data, as discussed above, begins.

At decision 306, the method 300 includes determining if a power level of the load 16 ($P_{LOAD}$) of the electronic device 14 is at or exceeds a threshold power level for performing out of band communications ($P_{OOB}$). $P_{LOAD}$ may be determined by extracting data from the device controller 84 and/or the wireless receiver system 30 and any components thereof. For example, the device controller 84 may monitor $P_{LOAD}$ and communicate $P_{LOAD}$ to one or both of the wireless receiver system 30 and the receiver out of band communications system 82, then said information of $P_{LOAD}$ may be communicated, respectively, to the wireless transmission system and the transmission out of band communications system 72. Alternatively, $P_{LOAD}$ may be determined by one or more alternative monitoring systems or methods, such as determining an impedance across the wireless power transfer system 10 and determining $P_{LOAD}$ based on said impedance.

$P_{OOB}$ may be a threshold power level for the load 16, such that the load 16 can properly power the receiver out of band communications system 82 for continuous and reliable out of band data transfer. Thus, if a load is completely or nearly fully depleted of power, logically it cannot provide power to the out of band communications system 82 and, thus, data transfer is only possible over the inductive link between the systems 20, 30, until the wireless power provided over the inductive link between systems 20, 30 raises $P_{LOAD}$ to or above $P_{OOB}$. However, once $P_{LOAD}$ meets or exceeds $P_{OOB}$, the out of band communications system 82 becomes functional and hand over of data transmission to the out of band communications system 82 is enabled.

At decision 306, if $P_{LOAD}$ is not greater than or equal to $P_{OOB}$, then the method 300 continues to block 308, wherein wireless power and data transmission is performed over the near field inductive link between the systems 20, 30 and the method 300 continues to monitor $P_{LOAD}$. However, if $P_{LOAD}$ is greater than $P_{OOB}$, thus exceeding the threshold for out of band communications, then the method 300 may continue to block 310, wherein authorization for the out of band communications system is performed.

Figure 20:
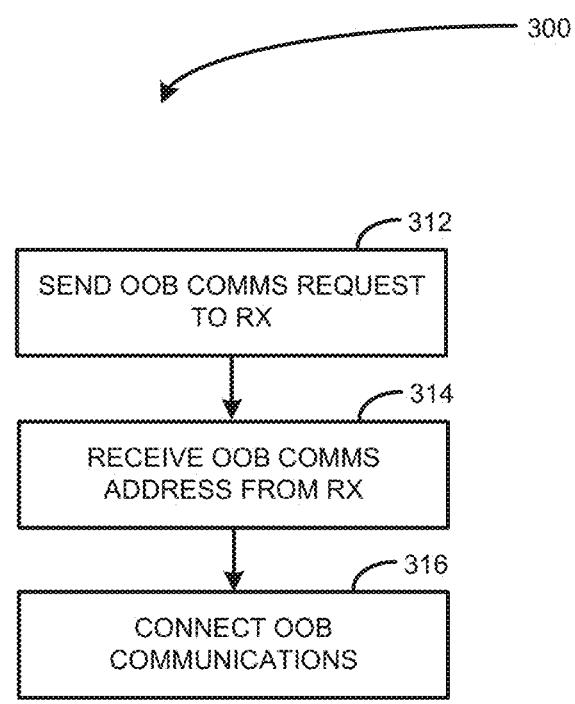
FIG. 20 is a flowchart for an example sub method of the method of FIG. 18, related to authorizing out of band communications for wireless data transfer, in accordance with the present disclosure.

Turning now to FIG. 20 and with continued reference to FIG. 19, a block diagram for sub-steps of the authorization step of block 310 is illustrated. The authorization step begins with one of the out of band communications systems 72, 82 sending the other system 72, 82 a communications request, as illustrated in block 312. Thus, either the transmission out of band communications system 72 or the receiver out of band communications system 82 may be responsible for initiating the authorization process or, more broadly, initiate out of band communications itself. Then, the requesting system 72, 82 may receive a response from the receiving system 72, 82, which includes a communications address or identifier associated with the receiving system 72, 82 and/or associated with its respective, associated system 20, 30, as illustrated in block 314. In some examples, the communications address is a media access control (MAC) address associated with the electronic device 14. In some additional or alternative examples, the communications address may include a hashed address, an encrypted signal, a hardware identifier, a personal authentication token, among other communications addresses known in the art. With the communications address known by the requesting out of band communications system 72, 82, the out of band communications systems 72, 82 with authorize communications between said systems 72, 82, connect the systems 72, 82 (block 316), and proper hand off of data transfer may be made to the out of band communications systems 72, 82.

Returning now to FIG. 19, after authorization at block 310, the method 300 includes transferring the significant data transmission from the wireless transmission system 20 to the transmission out of band communications system 72. In such examples, the wireless transmission system may continue to transfer meaningful wireless power over the near field inductive connection between the systems 20, 30, as illustrated in block 322. Optionally, in such examples, data associated specifically with the wireless power transfer operations (e.g., voltage levels, power requests, current requests, load impedance, etc.) may still be transferred in band of the wireless power signals, as illustrated in block 324.

As illustrated in block 326, during wireless power transfer with out of band data transmission, the method 300 may continually determine if $P_{LOAD}$ has met or exceeded a maximum power level at the load (PEND), at which wireless power transfer operations should be halted. For example, in examples wherein the load 16 is a battery, PEND may be a charge or power level at which said battery is fully charged. If $P_{LOAD}$ is greater than or equal to PEND, then wireless power transfer via the near field inductive link between the systems 20, 30 may be halted, as illustrated in block 328; otherwise, the transfer of power and data of blocks 320, 322, 324 may continue.

Referring now to decision 330, during out of band data transmission, if data transmission over the out of band communications systems 72, 82 is complete, then the method 300 will halt out of band data transfer (block 334) and determine if $P_{LOAD}$ is greater than or equal to PEND. If $P_{LOAD}$ is greater than or equal to PEND, then wireless power transfer via the near field inductive link between the systems 20, 30 may be halted, as illustrated in block 328; otherwise, the transfer of power and data of blocks 322, 324 may continue.

By enabling hand off of data transfer operations to the out of band communication systems 72, 82, data transfer between the host device 11 and the electronic device 14 may be optimized further. For example, the out of band communications systems 72, 82 may have faster data speeds than those achieved via the near field inductive link of the systems 20, 30; thus, once the load 16 is powered enough to hand out of band communications, faster data transfer between devices 11, 14 may be achieved. Additionally or alternatively, removing significant data transmission from being in band of the wireless power signals transferred between systems 20, 30 may provide for faster, more efficient and/or more accurate wireless power transfer between the systems 20, 30.

With respect to any of the data transmission systems disclosed herein, it should be appreciated that either or both of the wireless power sender and the wireless power receiver may wirelessly send in-band legacy data. Moreover, the systems, methods, and apparatus disclosed herein are designed to operate in an efficient, stable and reliable manner to satisfy a variety of operating and environmental conditions. The systems, methods, and/or apparatus disclosed herein are designed to operate in a wide range of thermal and mechanical stress environments so that data and/or electrical energy is transmitted efficiently and with minimal loss. In addition, the system 10 may be designed with a small form factor using a fabrication technology that allows for scalability, and at a cost that is amenable to developers and adopters. In addition, the systems, methods, and apparatus disclosed herein may be designed to operate over a wide range of frequencies to meet the requirements of a wide range of applications.

While illustrated as individual blocks and/or components of the wireless transmission system 20, one or more of the components of the wireless transmission system 20 may combined and/or integrated with one another as an integrated circuit (IC), a system-on-a-chip (SoC), among other contemplated integrated components. To that end, one or more of the transmission control system 26, the power conditioning system 40, the sensing system 50, the transmitter coil 21, and/or any combinations thereof may be combined as integrated components for one or more of the wireless transmission system 20, the wireless power transfer system 10, and components thereof. Further, any operations, components, and/or functions discussed with respect to the wireless transmission system 20 and/or components thereof may be functionally embodied by hardware, software, and/or firmware of the wireless transmission system 20.

Similarly, while illustrated as individual blocks and/or components of the wireless receiver system 30, one or more of the components of the wireless receiver system 30 may combined and/or integrated with one another as an IC, a SoC, among other contemplated integrated components. To that end, one or more of the components of the wireless receiver system 30 and/or any combinations thereof may be combined as integrated components for one or more of the wireless receiver system 30, the wireless power transfer system 10, and components thereof. Further, any operations, components, and/or functions discussed with respect to the wireless receiver system 30 and/or components thereof may be functionally embodied by hardware, software, and/or firmware of the wireless receiver system 30.

In an embodiment, a ferrite shield may be incorporated within the antenna structure to improve antenna performance. Selection of the ferrite shield material may be dependent on the operating frequency as the complex magnetic permeability ($\mu = \mu' - j*\mu''$) is frequency dependent. The material may be a polymer, a sintered flexible ferrite sheet, a rigid shield, or a hybrid shield, wherein the hybrid shield comprises a rigid portion and a flexible portion. Additionally, the magnetic shield may be composed of varying material compositions. Examples of materials may include, but are not limited to, zinc comprising ferrite materials such as manganese-zinc, nickel-zinc, copper-zinc, magnesium-zinc, and combinations thereof.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub combination or variation of a sub combination. As a further example, it will be appreciated that although UART and the NFC protocols are used as specific example communications schemes herein, other wired and wireless communications techniques may be used where appropriate while embodying the principles of the present disclosure.

What is claimed is:

1. A method for providing an electronic device, the method comprising:
    manufacturing the electronic device at a manufacturing location, wherein manufacturing the electronic device comprises connecting a wireless receiver system to the electronic device;
    packaging the electronic device at a packaging location; and
    wirelessly transmitting data to the electronic device at a data transmission site, wherein wirelessly transmitting data to the electronic device is performed by:
        determining, by a wireless transmission system, a presence of the wireless receiver system;
        starting wireless power and data transfer via the wireless transmission system, if the presence of the wireless receiver system is detected;
        transmitting a universal asynchronous receiver-transmitter (UART) compliant data signal via near field magnetic induction utilizing a wireless transmission system in accordance with a Near Field Communication (NFC) data transfer protocol, wherein the UART compliant data signal is packetized in a synchronous NFC data stream having a header with a synchronizing command and length command;
        determining, by the wireless transmission system, an impedance across the wireless transmission system and wireless receiver system;
        determining, by the wireless transmission system, the power at a load associated with the wireless receiver system based on the determined impedance;
        determining, by the wireless transmission system, if power at a load associated with the wireless receiver system exceeds a threshold for out of band communications;
        handing over wireless data transfer to an out of band communications system if the power at the load exceeds the threshold for out of band communications; and
        transmitting data via the out of band communications system, the wireless transmission system configured to magnetically connect with the wireless receiver system associated with the electronic device.

2. The method of claim 1, wherein one or both of the manufacturing location and the packaging location are sites independent of the data transmission site.

3. The method of claim 1, wherein the data is transmitted as part of a software update, a firmware update, a software application, a firmware, or combinations thereof.

4. The method of claim 3, wherein the data wirelessly transmitted to the electronic device is specific to a region within which the electronic device is provided.

5. The method of claim 1, further comprising wirelessly transmitting electrical power signals for powering a load associated with the electronic device, utilizing a connection between the wireless transmission system and the wireless receiver system.

6. The method of claim 1, wherein wirelessly transmitting data to the electronic device further comprises:
if the power at the load exceeds the threshold for out of band communications, authorizing the out of band communications with the out of band communications system, prior to handing over the wireless data transfer to the out of band communications system.

7. The method of claim 6, wherein authorizing the out of band communications with the out of band communications system comprises sending an out of band communications request to a receiver out of band communications system associated with the wireless receiver system.

8. The method of claim 7, wherein authorizing the out of band communications with the out of band communications system comprises receiving a communications address associated with the wireless receiver system, in response to the out of band communications request.

9. The method of claim 8, wherein the communications address is a media access control (MAC) address associated with the wireless receiver system.

10. The method of claim 8, wherein authorizing the out of band communications with the out of band communications system comprises connecting the out of band communications system with the receiver out of band communications system via the communications address.

11. The method of claim 7, wherein the out of band communications system and the receiver out of band communications system are Bluetooth communications systems.

12. The method of claim 1, wherein wirelessly transmitting data to the electronic device further comprises halting the wireless data transfer when a data transfer operation is complete.

13. The method of claim 1, wherein wirelessly transmitting the data to the electronic device further comprises continuing transfer of wireless power related data, via the wireless transmission system, after the wireless data transfer is handed over to the out of band communications system.

14. A method of operating a wireless power and data transfer system through commercial packaging, the method comprising:
determining, by a wireless transmission system, a presence of a wireless receiver system;
starting wireless power and data transfer via the wireless transmission system, if the presence of the wireless receiver system is detected, wherein wireless data transfer via the wireless transmission system comprises transferring a universal asynchronous receiver-transmitter (UART) compliant data signal via near field magnetic induction in accordance with a Near Field Communication (NFC) data transfer protocol, wherein the UART compliant data signal is packetized in a synchronous NFC data stream having a header with a synchronizing command and length command;
determining, by the wireless transmission system, an impedance across the wireless transmission system and wireless receiver system;
determining, by the wireless transmission system, the power at a load associated with the wireless receiver system based on the determined impedance;
determining, by the wireless transmission system, if power at a load associated with the wireless receiver system exceeds a threshold for out of band communications; and
if the power at the load exceeds the threshold for out of band communications, handing over the wireless data transfer to an out of band communications system that is in operative communication with the wireless transmission system.

15. The method of claim 14, further comprising:
if the power at the load exceeds the threshold for out of band communications, authorizing the out of band communications with the out of band communications system, prior to handing over the wireless data transfer to the out of band communications system.

16. The method of claim 15, wherein authorizing the out of band communications with the out of band communications system comprises sending an out of band communications request to a receiver out of band communications system associated with the wireless receiver system.

17. The method of claim 14, wherein the out of band communications system is a Bluetooth communications system.

18. The method of claim 14, further comprising halting the wireless data transfer, when a data transfer operation is complete.

19. The method of claim 14, further comprising:
continuing transfer of wireless power related data, via the wireless transmission system, after the wireless data transfer is handed over to the out of band communications system.

* * * * *